(12) United States Patent
Cai

(10) Patent No.: US 11,784,432 B2
(45) Date of Patent: Oct. 10, 2023

(54) FIXED PIN CHARGER HAVING MULTIPLE BODY COVERS

(71) Applicant: GUANGDONG OPPO MOBILE TELECOMMUNICATIONS CORP., LTD., Dongguan (CN)

(72) Inventor: Hongzhen Cai, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/715,865

(22) Filed: Apr. 7, 2022

(65) Prior Publication Data

US 2022/0231447 A1 Jul. 21, 2022

Related U.S. Application Data

(63) Continuation of application No. PCT/CN2020/118640, filed on Sep. 29, 2020.

(30) Foreign Application Priority Data

Oct. 30, 2019 (CN) .......................... 201911047681.6
Oct. 30, 2019 (CN) .......................... 201921849758.7

(51) Int. Cl.
*H01R 13/447* (2006.01)
*H01R 31/06* (2006.01)
*H02J 7/00* (2006.01)

(52) U.S. Cl.
CPC ......... *H01R 13/447* (2013.01); *H01R 31/065* (2013.01); *H02J 7/0042* (2013.01)

(58) Field of Classification Search
CPC ............................ H01R 13/447; H01R 31/065; H01R 2107/00; H01R 24/60; H02J 7/0042

See application file for complete search history.

(56) References Cited

U.S. PATENT DOCUMENTS

| 6,346,793 B1 | 2/2002 | Shibata et al. |
| 2013/0017696 A1* | 1/2013 | Alvarez Rivera . H01R 13/5213 439/142 |
| 2017/0214169 A1* | 7/2017 | Hayakawa .............. G06F 1/181 |

FOREIGN PATENT DOCUMENTS

| CN | 201490447 U | 5/2010 |
| CN | 104053326 A | 9/2014 |

(Continued)

OTHER PUBLICATIONS

International Search Report and Written Opinion dated Dec. 31, 2020 in International Application No. PCT/CN2020/118640. English translation attached.

(Continued)

*Primary Examiner* — Michael C Zarroli
(74) *Attorney, Agent, or Firm* — Sheppard, Mullin, Richter & Hampton LLP

(57) ABSTRACT

A charger includes a body and a pin. The body includes a main body, a first cover body, and a second cover body. The pin is fixedly disposed on the main body. The first cover body and the second cover body are each connected to an rotatable relative to the main body to have a first state and a second state. In the first state, the first cover body and the second cover body are attached to each other, and at least part of a structure of the pin is accommodated in the first cover body and second cover body. In the second state, the first cover body and the second cover body depart from each other to enable the first cover body and the second cover body to expose the at least part of the structure of the pin to the outside.

17 Claims, 20 Drawing Sheets

(56) References Cited

FOREIGN PATENT DOCUMENTS

| | | |
|---|---|---|
| CN | 203827007 U | 9/2014 |
| CN | 104409911 A | 3/2015 |
| CN | 205961461 U | 2/2017 |
| CN | 206237422 U | 6/2017 |
| CN | 107332013 A | 11/2017 |
| CN | 207038895 U | 2/2018 |
| CN | 207149786 U | 3/2018 |
| CN | 207782019 U | 8/2018 |
| CN | 208445310 U | 1/2019 |
| CN | 211063364 U | 7/2020 |
| TW | M314875 U | 7/2007 |

OTHER PUBLICATIONS

Extended European Search Report dated Sep. 29, 2022 received in European Patent Application No. EP 20882887.1.

* cited by examiner

FIXED PIN CHARGER HAVING MULTIPLE BODY COVERS

CROSS-REFERENCE TO RELATED APPLICATIONS

The present application is a continuation of International Application No. PCT/CN2020/118640, filed on Sep. 29, 2020, which claims priorities to and the benefits of Chinese Patent Application No. 201911047681.6 and Chinese Patent Application No. 201921849758.7, filed on Oct. 30, 2019. The disclosures of the aforementioned applications are hereby incorporated by reference in their entireties.

FIELD

The present disclosure relates to the field of electronic product technologies, and particularly, to a charger.

BACKGROUND

For chargers available on the market, pins of the charger are folded and stored in a housing when the charger is not in use, and rotated out of the housing when the charger is put in use. Such a folding structure of the charger occupies a large space, as a result, the charger has a relatively large size, low portability, and a poor appearance.

SUMMARY

In view of the above, it is necessary to provide a charger.

A charger is provided. The charger includes: a body including a main body, a first cover body, and a second cover body; and a pin fixedly disposed on the main body. The first cover body and the second cover body are each connected to and rotatable relative to the main body to have a first state and a second state. In the first state, the first cover body and the second cover body are attached to each other, and at least part of a structure of the pin is accommodated in the first cover body and the second cover body. In the second state, the first cover body and the second cover body depart from each other to enable the first cover body and the second cover body to expose the at least part of the structure of the pin to the outside.

A charger is provided. The charger includes: a body including a main body and a cover body; and a pin fixedly disposed on the main body. The cover body is connected to and rotatable relative to the main body to have a first state and a second state. In the first state, at least part of a structure of the pin is accommodated in the cover body. In the second state, an end surface of the cover body connected to the main body is flush with an end surface of the main body where the pin is disposed.

A charger is provided. The charger includes: a body including a cover body and a body that are connected to each other; and a pin fixed to the main body. The cover body is rotatable relative to the main body to have a first state and a second state. In the first state, at least part of a structure of the pin is accommodated in the cover body. In the second state, the cover body and the main body are stacked on each other, and a minimum distance between the pin and an edge of the body is equal to or greater than a predetermined value.

BRIEF DESCRIPTION OF DRAWINGS

In order to clearly explain technical solutions of embodiments of the present disclosure or in the related art, drawings used in the description of the embodiments or the related art are briefly described below. Obviously, the drawings described below are merely some embodiments of the present disclosure. Based on these drawings, other drawings of the embodiments can be obtained by those skilled in the art without creative efforts.

DESCRIPTION OF EMBODIMENTS

Figure 1:
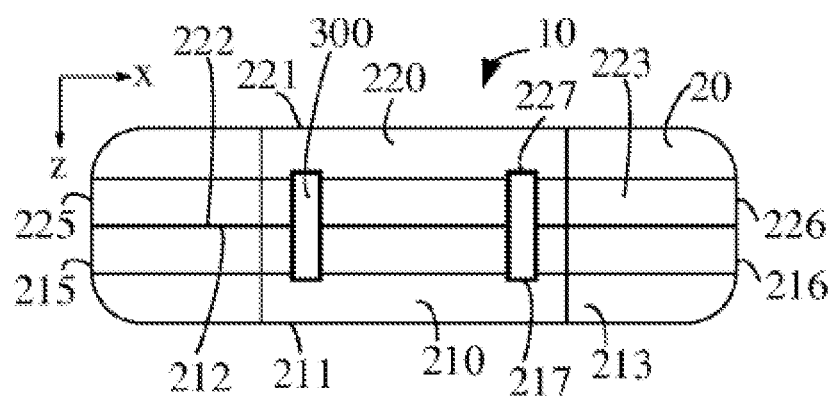
FIG. 1 is a top view of a charger according to an embodiment, in which the charger is in a first state.

The present disclosure will be described comprehensively below with reference to the accompanying drawings for facilitating the understanding of the present disclosure, and the accompanying drawings illustrate preferred embodiments of the present disclosure. However, the present disclosure can be implemented in many different forms and is not limited to the embodiments described herein. On the contrary, these embodiments are provided to facilitate a thorough and comprehensive understanding of the present disclosure.

As illustrated in FIG. 1 to FIG. 4, an embodiment provides a charger 10, which includes a body 20 and a pin 300 fixed to the body 20. The body 20 includes a main body 100 and a cover body connected to the main body 100, and the pin is fixedly disposed on an end surface of the main body 100. The cover body is rotatable relative to the main body 100 to enable the charger 10 to have a first state and a second state. In the first state, the cover body is disposed on and covers the main body 100, and at least part of a structure of the pin 300 is accommodated in the cover body. In the second state, an end surface of the cover body connected to the main body 100 is flush with an end surface of the main body 100 where the pin 300 is arranged. It can be understood that the expression "being flush with" can mean being coplanar with or allowing a height difference within a certain range, e.g., a height difference between the end surface of the cover body connected to the main body 100 and the end surface of the main body 100 where the pin 300 is arranged is equal to or smaller than 5 mm, 10 mm, etc., which shall fall within the protection scope of the present disclosure. An accommodating space is defined in the main body 100, and a circuit board 700 is disposed in the accommodating space, and the circuit board 700 is electrically connected to the pin 300. In an embodiment, the main body 100 has a rectangular parallelepiped or cube structure, and corners of the main body 100 can be rounded to remove ridges from the charger 10, such that the charger 10 can have good touch feeling. In other embodiments, the main body 100 may also have a cylindrical structure or other structures, which is not specifically limited in the present disclosure.

The cover body includes a first cover body 210 and a second cover body 220, which are respectively fixed to edges of one end of the main body 100, and respectively fixed to two opposite sides of the main body 100. The pin 300 is fixed to an end portion of the main body 100 and is located at the same end as the first cover body 210 and the second cover body 220. A charging interface 109 is defined in the main body 100. The charging interface 109 and the pin 300 are located at two opposite ends of the main body 100, respectively. An external electronic component can be electrically connected to the circuit board 700 through the charging interface 109 and thus electrically connected to the pin 300. After the charger 10 is electrically connected to a power source, the power source can supply power to the external electronic component.

As illustrated in FIG. 1 to FIG. 4, in an embodiment, the charger 10 includes a length direction, i.e., a direction Y, a width direction, i.e., a direction X, and a thickness direction, i.e., a direction Z. The pin 300 extends along the length direction, i.e., the direction Y, of the charger 10. That is, a length direction of the pin 300 is the direction Y The main body 100 includes a first surface 101 and a second surface 102 that are opposite to each other, a first side surface 103 and a second side surface 104 that are opposite to each other, and a first end surface 105 and a second end surface 106 that are opposite to each other. The first surface 101 and the second surface 102 define the thickness direction of the charger 10, i.e., the direction Z. The first side surface 103 and the second side surface 104 define the width direction of the charger 10, i.e., the direction X. The first end surface 105 and the second end surface 106 define a length direction of the main body 100. The length direction of the charger 10, i.e., the direction Y, is the same as the length direction of the main body 100. The pin 300 extends out of the main body 100 along the length direction of the charger 10. In another embodiment, the pin 300 may also extend along the width direction of the charger 10. The pin may be designed based on practical requirements of the charger 10.

Chamfers and smooth transitions are designed between adjacent surfaces of the main body 100 to provide the charger 10 with a smooth and edge-free feeling. The pin 300 is fixed to the first end surface 105, the first cover body 210 is fixed to a junction between the first end surface 105 and the first surface 101, and the second cover body 220 is fixed to a junction between the first end surface 105 and the second surface 102. It can be understood that a chamfer may be provided or may not be provided between the first end surface 105 and an adjacent surface.

Figure 5:
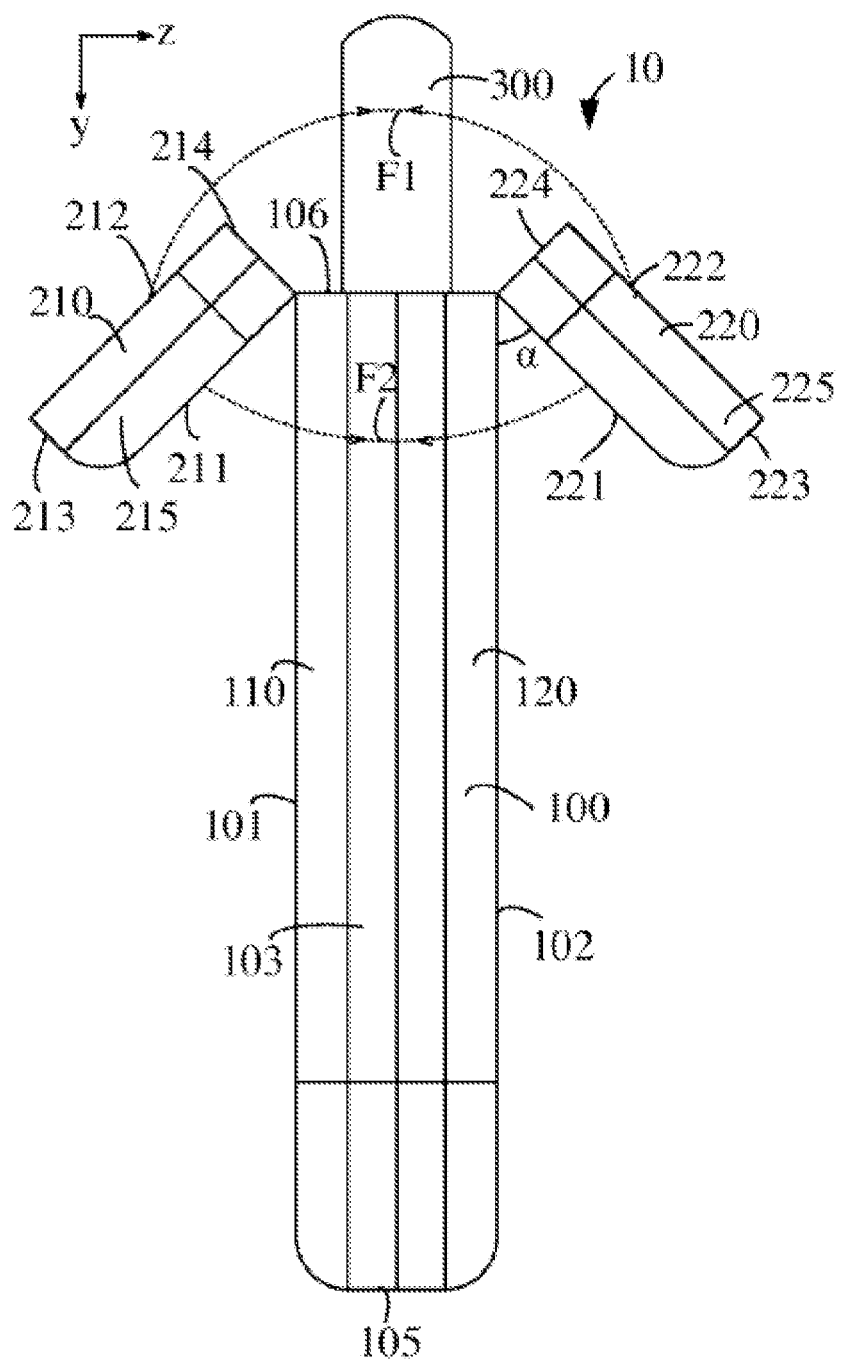
FIG. 5 is a schematic diagram of a charger illustrated in FIG. 3, in which the charger is in a state between a first state and a second state.
Figure 6A:
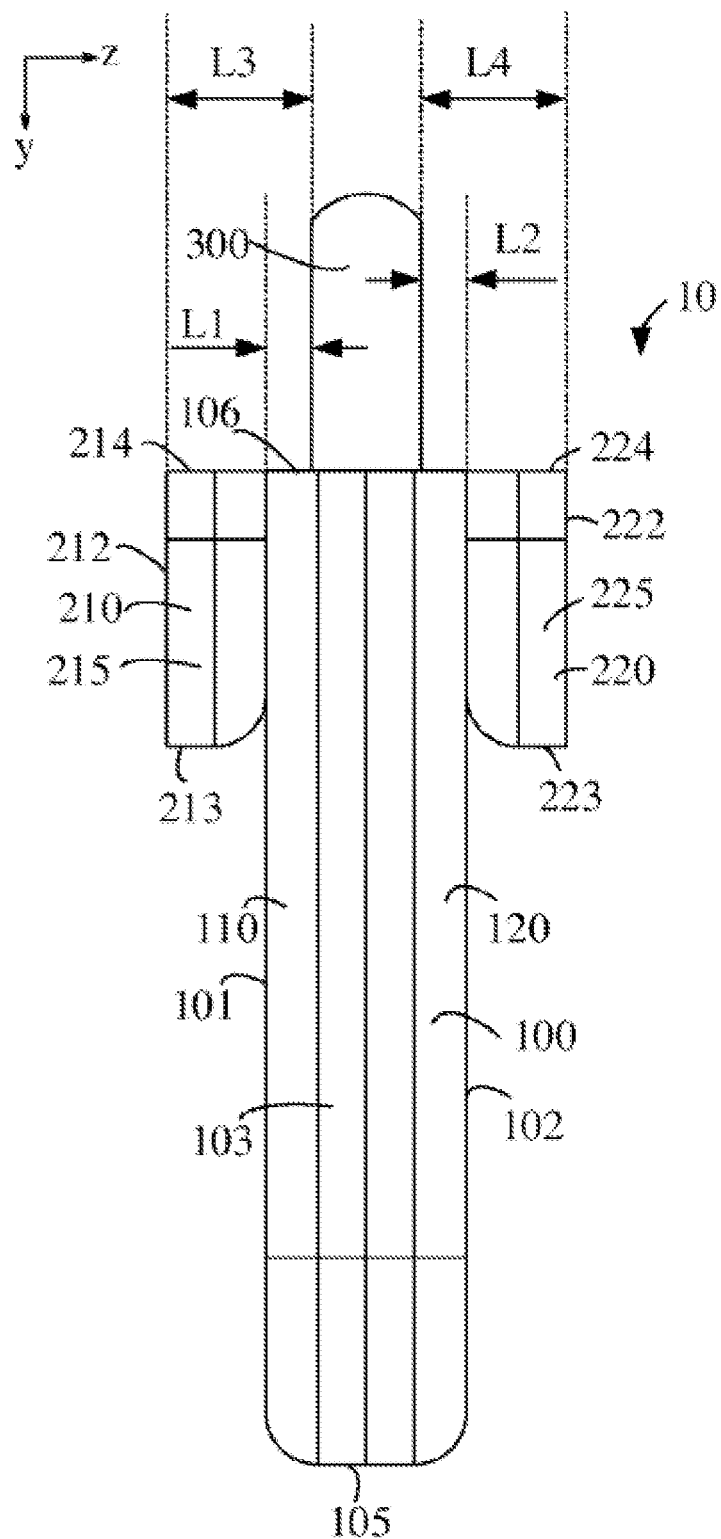
FIG. 6a is a schematic diagram of a charger illustrated in FIG. 3, in which the charger is in a second state.

As illustrated in FIG. 5 and FIG. 6a, in an embodiment, the first cover body 210 includes a first outer surface 211 and a first inner surface 212 that are opposite to each other, a first top surface 213 and a first bottom surface 214 that are opposite to each other, and a first left side surface 215 and a first right side surface 216 that are opposite to each other. A smooth transition can be provided between adjacent surfaces of the first cover body 210 to make the first cover body 210 feel smooth. It can be understood that a chamfer may be provided between the first bottom surface 214 and an adjacent surface for a smooth transition, or no chamfer may be provided. The second cover body 220 includes a second outer surface 221 and a second inner surface 222 that are opposite to each other, a second top surface 223 and a second bottom surface 224 that are opposite to each other, and a second left side surface 225 and a second right side surface 226 that are opposite to each other. A smooth transition can be designed between adjacent surfaces of the second cover body 220 to make the second cover body 220 feel smooth. It can be understood that a chamfer may be provided between the second bottom surface 224 and an adjacent surface for a smooth transition, or no chamfer may be provided.

As illustrated in FIG. 5 and FIG. 6a, in an embodiment, the first cover body 210 and the second cover body 220 are rotatable relative to the main body 100 around the width direction of the charger 10, so as to have the second state and the first state, i.e., the charger 10 has the second state and the first state. In another embodiment, the first cover body 210 and the second cover body 220 may also be rotatable relative to the main body 100 around the length direction of the charger 10. As illustrated in FIG. 6a, in the second state, the first cover body 210 and the second cover body 220 depart from each other, the first cover body 210 is attached to one side of the main body 100, the second cover body 220 is attached to the other side of the main body 100, and end surfaces of the first cover body 210 and the second cover body 220 that are connected to the main body 100 are flush with the end surface of the main body 100 where the pin 300 is disposed, i.e., both the first bottom surface 214 and the second bottom surface 224 are flush with the second end surface 106, thereby exposing the pin 300 to the outside. It can be understood that "being flush with" can mean being coplanar with or allowing a height difference within a certain range, e.g., a height difference between the end surfaces of the first cover body 210 and the second cover body 220 that are connected to the main body 100 and the end surface of the main body 100 where the pin 300 is arranged is equal to or smaller than 5 mm, 10 mm, or other sizes, which shall also fall within the protection scope of the present disclosure. Similarly, "attached to" can mean that two surfaces are completely connected to each other without or with a spacing. For example, a spacing between the first cover body 210 and a surface of the main body 100 and a spacing between the second cover body 220 and a surface of the main body 100 are both equal to or smaller than 1 mm, 2 mm, or other sizes, which shall also fall within the protection scope of the present disclosure.

Figure 2:
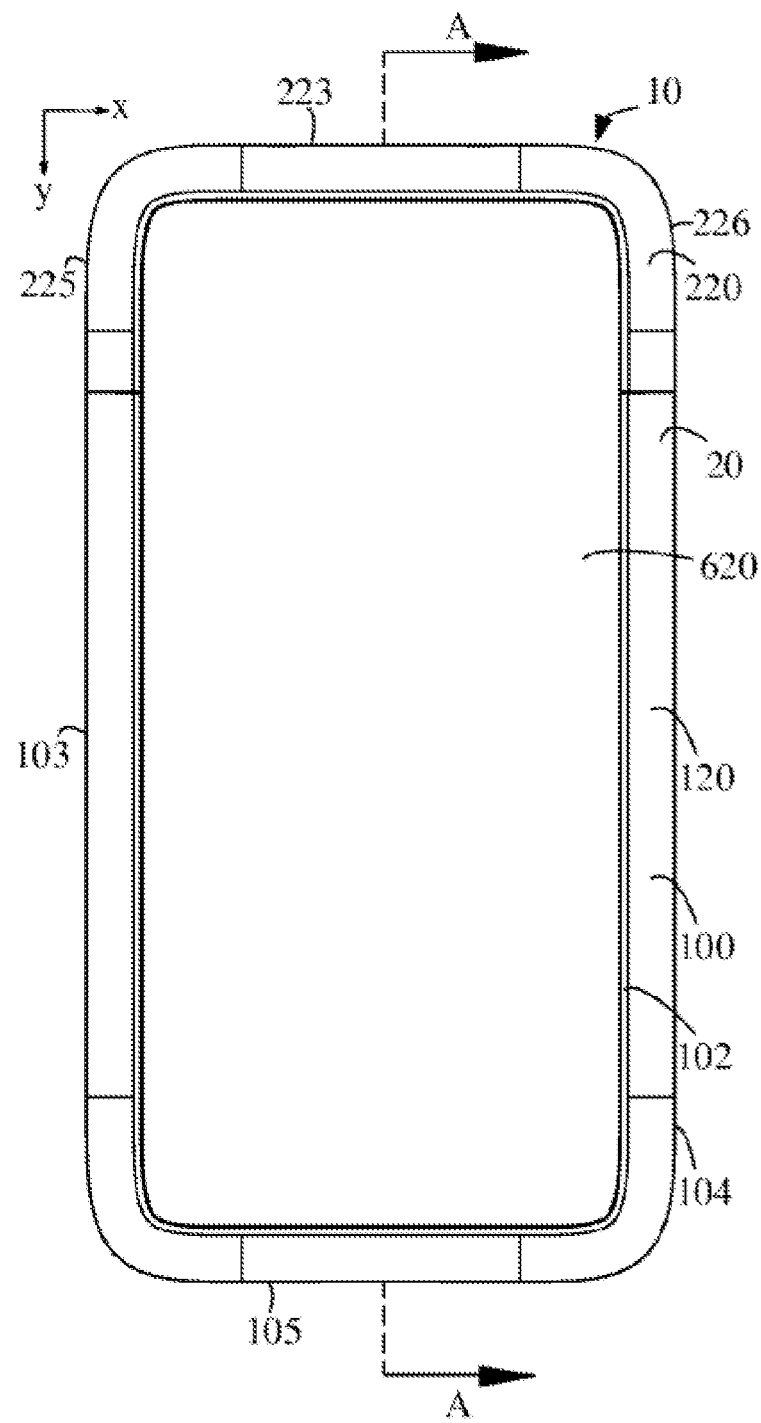
FIG. 2 is a front view of a charger illustrated in FIG. 1.
Figure 3:
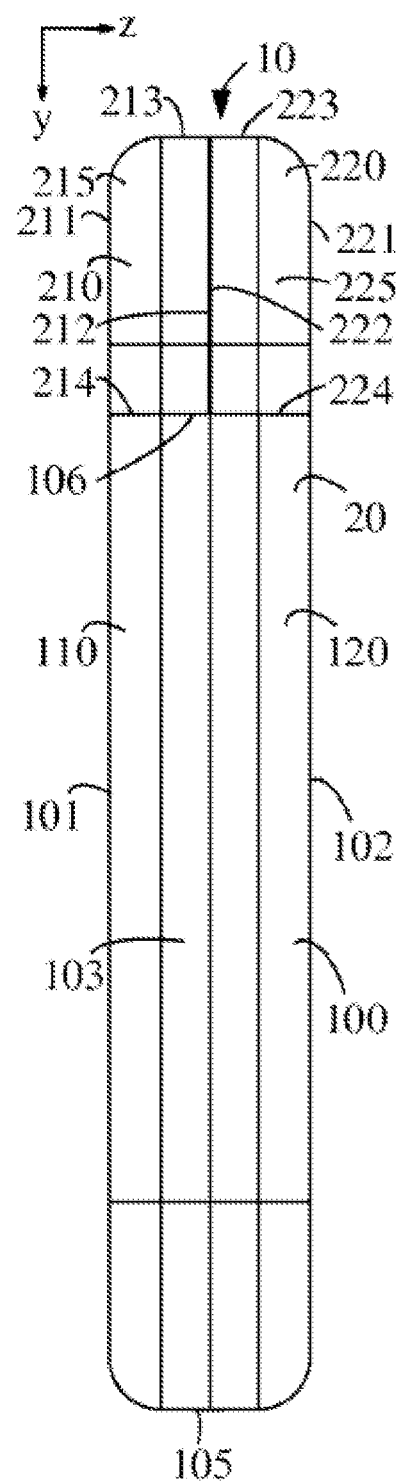
FIG. 3 is a left side view of a charger illustrated in FIG. 2.
Figure 4:
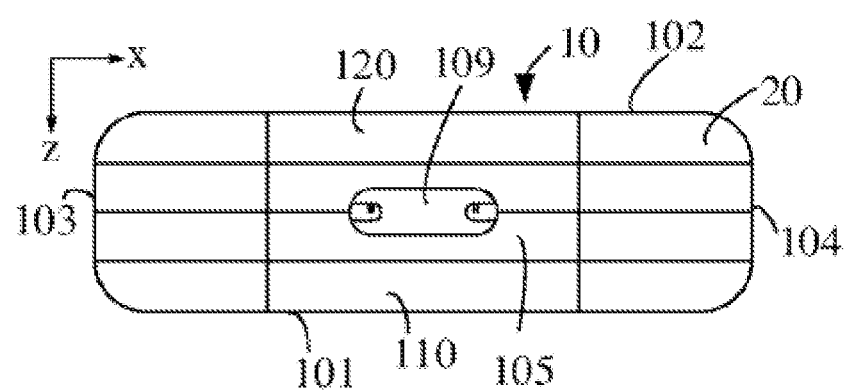
FIG. 4 is a bottom view of a charger illustrated in FIG. 2.

As illustrated in FIG. 2 and FIG. 3, in the first state, an entire structure of the pin 300 is covered by the first cover body 210 and the second cover body 220, the first inner surface 212 and the second inner surface 222 are attached to and in contact with each other, the first outer surface 211 is flush with the first surface 101, the second outer surface 221 is flush with the second surface 102, the first left side surface 215 is flush with the first side surface 103, and the first right side surface 216 is flush with the second side surface 104. One surface being flush with another surface may mean the two surfaces being coplanar or allowing a slight height difference between the two surfaces, both cases shall fall within the protection scope of the present disclosure. When the first inner surface 212 is attached to the second inner surface 222, the first inner surface 212 and the second inner surface 222 may be completely adhered to each other without or with a spacing, e.g., equal to or smaller than 1 mm, 2 mm, or other sizes. In the first state, an appearance of the charger 10 is an integral rectangular parallelepiped structure, which presents a good visual effect, and the pin 300 is completely covered and hidden. Thus, when a user puts the charger 10 in a pocket or a suitcase, the charger 10 will not damage the surrounding objects. In another embodiment, in the first state, a part of the structure of the pin 300 is covered by the first cover body 210 and the second cover body 220, and another part of the structure of the pin 300 is exposed out of the first cover body 210 and the second cover body 220.

In an embodiment, a first engagement slot 217 is defined in the first cover body 210 (illustrated in FIG. 8), extends to the first inner surface 212, and has a shape similar to that of the pin 300; and a second engagement slot 227 is defined in the second cover body 220 (illustrated in FIG. 8), extends to the second inner surface 222, and has a shape similar to that of the pin 300. In the first state, the first engagement slot 217 is in communication with the second engagement slot 227, and the pin 300 can be accommodated in the first engagement slot 217 and the second engagement slot 227. In an embodiment, along the length direction of the pin 300, i.e., the direction Y, the first engagement slot 217 extends to the first bottom surface 214 and is spaced apart from the first top surface 213 by a certain distance; and the second engagement slot 218 extends to the second bottom surface 224 and is spaced apart from the second top surface 223 by a certain distance. Therefore, in the first state of the charger 10, the pin 300 is completely hidden and not exposed, and the appearance of the charger 10 presents a structure such as an intact rectangular parallelepiped or cube, thereby ensuring integrity of the appearance of the charger 10. In another embodiment, along the length direction of the pin 300, i.e., the direction Y, the first engagement slot 217 extends to the first bottom surface 214 and the first top surface 213, and the second engagement slot 218 extends to the second bottom surface 224 and the second top surface 223. That is, lengths of the first cover body 210 and the second cover body 220 are equal to a length of the pin 300 protruding from the main body 100, such that in the first state of the charger 10, the pin 300 is flush with both the first top surface 213 and the second top surface 223. In this case, the charger 10 is short in length, light and thin, and convenient to carry.

In an embodiment, two pins 300 are provided, and accordingly, two first engagement slots 217 and two second engagement slots 227 are provided. In another embodiment, one, three, or more pins 300 may be provided, and the number of the first engagement slots 217 and the number of the second engagement slots 227 correspond to the number of the pins 300.

In another embodiment, the first cover body 210 has a hollow box structure with an opening, and the second cover body 220 has a hollow box structure with an opening. In the first state, a closed internal space is defined by the first cover body 210 and the second cover body 220, the pin 300 is accommodated in the closed internal space defined by the first cover body 210 and the second cover body 220, and an amount of the pin 300 is not limited.

As illustrated in FIG. 6a, in an embodiment, compared with the first state of the charger 10, in the second state of the charger 10, the first cover body 210 and the second cover body 220 are each rotated about 180° around the width direction of the charger 10 as an axis. That is, the first cover body 210 and the second cover body 220 in the first state of the charger 10 are rotated 180° relative to the main body 100, such that the first outer surface 211 is attached and fixed to the first surface 101, and the second outer surface 221 is attached and fixed to the second surface 102, and thus the charger 10 is in the second state.

As illustrated in FIG. 6a, in an embodiment, two pins 300 are provided and arranged along the width direction of the charger 10, i.e., the direction X. A distance between one of the two pins 300 and the first surface 101 and a distance between the other one of the two pins 300 and the first surface 101 are both L1. A distance between one of the two pins 300 and the second surface 102 and a distance between the other one of the two pins 300 and the second surface 102 are both L2. In the second state of the charger 10, a distance between one of the two pins 300 and the first inner surface 212 and a distance between the other one of the two pins 300 and the first inner surface 212 are both L3; the distance L3 is equal to a sum of a thickness of the first cover body 210 and the distance L1; an distance between each of the two pins 300 and the second inner surface 222 is L4, and the distance L4 is equal to a sum of a thickness of the second cover body 220 and the distance L2. In the second state, a minimum distance between the pin 300 and an edge of the main body 100 is a minimum value of the distance L3 and the distance L4.

The safety regulation requirements stipulate that, in the second state of the charger 10, a distance between the pin 300 and an edge of the charger 10 should be equal to or greater than a predetermined value, and predetermined value can be 6.5 mm or other values, specifically depending upon the usage of the charger 10. In an embodiment, the distance L1 is equal to the distance L2, i.e., the two pins 300 are symmetrically arranged on the second end surface 106, and the distance L3 is equal to the distance L4, and accordingly, the minimum distance between each of the two pins 300 and the edge of the main body 100 is L3 or L4. The distance L1, e.g., 2.65 mm, is smaller than the predetermined value; and the distance L3, e.g., 8.4 mm, is equal to or greater than the predetermined value. In another embodiment, the distance L1 is unequal to the distance L2, i.e., the two pins 300 are asymmetrically arranged on the second end surface 106. As an example, when the two pins 300 are closer to the first surface 101, the distance L1 is smaller than the distance L2, and thus the distance L3 is smaller than the distance L4, and accordingly, the minimum distance between the two pins 300 and the edge of the main body 100 is the distance L3. As another example, when the two pins 300 are closer to the second surface 102, the distance L1 is greater than the distance L2, and thus the distance L3 is greater than the distance L4, and accordingly, the minimum distance between the two pins 300 and the edge of the main body 100 is the distance L4. In the present embodiment, both the distance L1 and the distance L2 are smaller than the predetermined value, and neither the distance L3 nor the distance L4 is smaller than the predetermined value.

In the first state of the charger 10, a thickness of the charger 10 is a sum of a size of the pin 300 in the direction Z, the distance L1, and the distance L2. Both the distance L1 and the distance L2 are smaller than the predetermined value. When the distance L1 and the distance L2 are small, the thickness of the charger 10 is small. The charger 10 with a relatively small thickness has an aesthetical appearance, a hi-tech sense, and is convenient to carry. In the second state, the charger 10 can meet the safety regulation requirements. That is, in the first state, the charger 10 in the present disclosure has a relatively small thickness and is convenient to carry; and in the second state, the distance between the pin 300 and the edge of the charger 10 is increased by attaching the first cover body 210 and the second cover body 220 to the main body 100, such that the charger 10 can meet the safety regulation requirements.

Figure 6B:
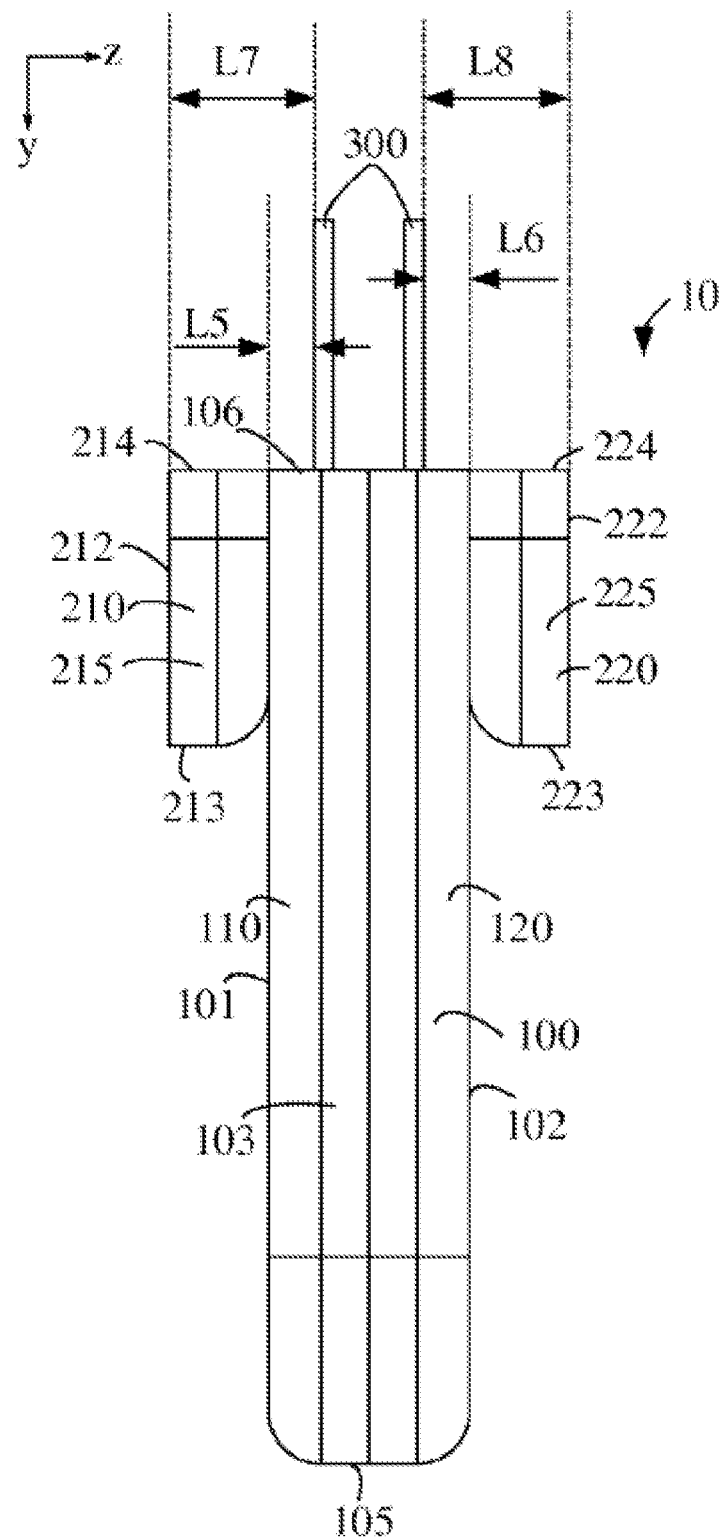
FIG. 6b is a side view of a charger according to another embodiment, in which the charger is in a second state.

As illustrated in FIG. 6b, in another embodiment, two pins 300 are arranged along the thickness direction of the charger 10, i.e., the direction Z. That is, one of the two pins 300 is closer to the first surface 101, and the other one of the two pins 300 is closer to the second surface 102. In the second state, the two pins 300 have different distances from an edge of the first cover body 210 (i.e., the first inner surface 212), and the two pins have different distances from the first surface 101; and the two pins 300 have different distances from an edge of the second cover body 220 (i.e., the second inner surface 222), and the two pins have different distances from the second surface 102. A minimum distance between the pin 300 and the first surface 101 is defined as a distance L5, and thus a distance between the pin 300 closer to the first surface 101 and the first surface 101 is the distance L5. In the second state, a minimum distance between the pin 300 and the first inner surface 212 is defined as a distance L7, and thus a distance between the pin 300 closer to the first surface 101 and the first inner surface 212 is the distance L7. A minimum distance between the pin 300 and the second surface 102 is defined as a distance L6, and thus a distance between the pin 300 closer to the second surface 102 and the second surface 102 is the distance L6. In the second state, a minimum distance between the pin 300 and the second inner surface 222 is defined as a distance L8, and thus a distance between the pin 300 closer to the second surface 102 and the second inner surface 222 is the distance L8. In the present embodiment, a minimum distance between the pin 300 and an edge of the body 20 is equal to or greater than the predetermined value, i.e., both the distance L7 and the distance L8 are equal to or greater than the predetermined value; and along the width direction of the charger 10, i.e., the direction X, the minimum distance between the pin 300 and the edge of the main body 100 is equal to or greater than the predetermined value, i.e., a minimum distance between the pin 300 and the first side surface 103 is equal to or greater than the predetermined value, and a minimum distance between the pin 300 and the second side surface 104 is equal to or greater than the predetermined value. The distance L5 may be equal or unequal to the distance L6, and both the distance L5 and the distance L6 are smaller than the predetermined value; and the distance L7 can be equal or unequal to the distance L8, and both the distance L7 and the distance L8 are equal to or greater than the predetermined value. In an embodiment, the predetermined value is 6.5 mm.

Figure 7A:
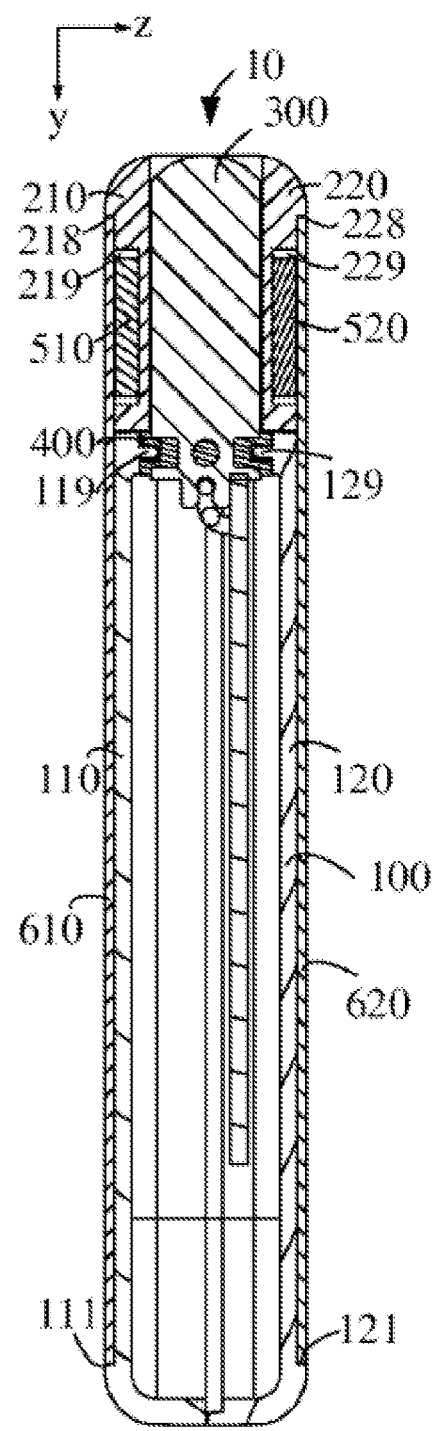
FIG. 7a is a cross-sectional view of a part A-A of a charger illustrated in FIG. 2.
Figure 8:
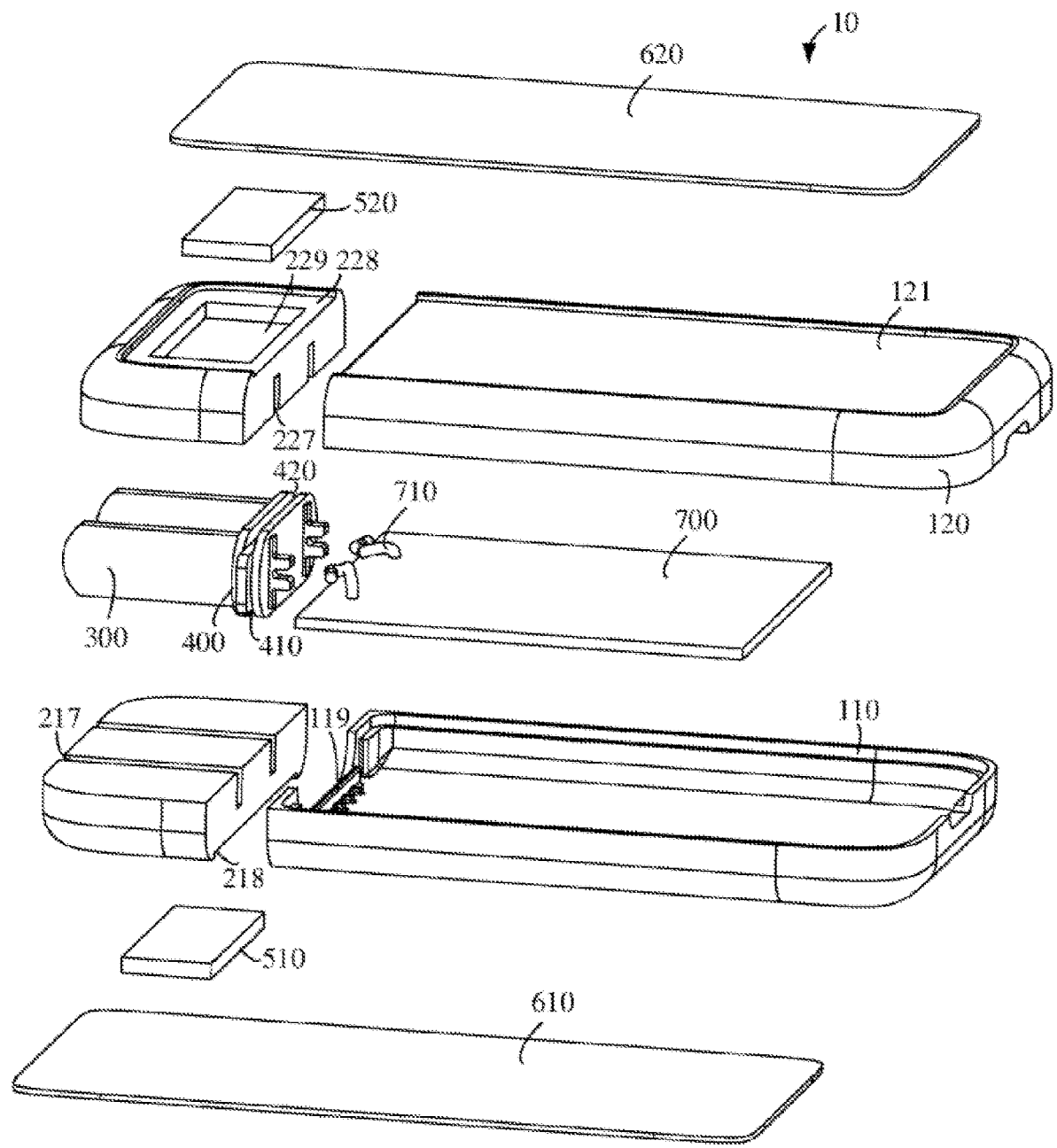
FIG. 8 is an exploded view of a charger illustrated in FIG. 2.

As illustrated in FIG. 7a and FIG. 8, in an embodiment, a first accommodating groove 111 and a second accommodating groove 121 are defined in the first surface 101 and the second surface 102 of the main body 100, respectively. A third accommodating groove 218 is defined in the first outer surface 211 of the first cover body 210 and opposite to the first engagement slot 217; and a fourth accommodating groove 228 is defined in the second outer surface 221 of the second cover body 220 and opposite to the second engagement slot 227. The first accommodating groove 111 and the third accommodating groove 218 are in communication with each other and have identical depths and widths; and the second accommodating groove 121 and the fourth accommodating groove 228 are in communication with each other and have identical depths and widths. It can be understood that the width of the first accommodating groove 111 may be smaller than or substantially equal to the width of the first surface 101; and the width of the second accommodating groove 121 may be smaller than or substantially equal to the width of the second surface 102.

The charger 10 includes a flexible element. The first cover body 210 and the main body 100 are rotatably connected to each other through the flexible element, and the second cover body 220 and the main body 100 are rotatably connected to each other through the flexible element. The flexible element includes a first flexible element 610 and a second flexible element 620. A part of a structure of the first flexible element 610 is accommodated in the first accommodating groove 111, and the remaining part of the structure of the first flexible element 610 is accommodated in the third accommodating groove 218. A thickness of the first flexible element 610 is equal to or substantially equal to the depth of the first accommodating groove 111 or the depth of the third accommodating groove 218. The first flexible element 610 may be flush with, slightly protrude from, or slightly recess in the first surface 101. The first flexible element 610 can be adhered or mechanically fixed to the first accommodating groove 111 and the third accommodating groove 218. A part of a structure of the second flexible element 620 is accommodated in the second accommodating groove 121, and the remaining part of the structure of the second flexible element 620 is accommodated in the fourth accommodating groove 228. A thickness of the second flexible element 620 is equal to or substantially equal to the depth of the second accommodating groove 121 or the depth of the fourth accommodating groove 228. The second flexible element 620 may be flush with, slightly protrude from, or slightly recess in the second surface 102. The second flexible element 620 can be adhered or mechanically fixed to the second accommodating groove 121 and the fourth accommodating groove 228. In an embodiment, the first flexible element 610 and the second flexible element 620 are made of a polymer material such as leather, MYLAR film, or silica gel, or other flexible, bendable or foldable materials, which is not specifically limited in the present disclosure.

The first cover body 210 and the second cover body 220 are connected to the main body 100 through the first flexible element 610 and the second flexible element 620, respectively. By virtue of flexibility of the first flexible element 610 and the second flexible element 620, the first flexible element 610 and the second flexible element 620 is arbitrarily rotatable and bendable at the junction between the first cover body 210 and the main body 100 as well as at the junction between the second cover body 220 and the main body 100, respectively, such that the charger 10 can be normally opened and closed. As illustrated in FIG. 3, FIG. 5, and FIG. 6a, the first cover body 210 and the second cover body 220 can rotate relative to the main body 100 around the width direction of the charger 10, i.e., the direction X, such that the first cover body 210 and the second cover body 220 can be side by side with respect to the main body 100 along the length direction of the charger 10, i.e., the direction Y. In this way, in the first state of the charger 10, the first flexible element 610 and the second flexible element 620 are in an unfolded state. When the charger 10 needs to be opened, the first cover body 210 and the second cover body 220 are rotated around the width direction of the charger 10, i.e., the direction X, to bend the first flexible element 610 and the second flexible element 620 and to attach the first cover body 210 and the second cover body 220 to two opposite sides of the main body 100, respectively, and in this case, the charger 10 is in the second state, in which the first flexible element 610 and the second flexible element 620 are in a folded state.

It can be understood that the first flexible element 610 may cover the entire region of the first surface 101 and the entire region of the first outer surface 211, or first flexible element 610 may cover a partial region of the first surface 101 and a partial region of the first outer surface 211, as long as the first cover body 210 can be connected to the main body 100, and the first cover body 210 is rotatable relative to the main body 100 around the width direction of the charger 10, i.e., the direction X. Similarly, the second flexible element 620 may cover the entire region of the second surface 102 and the entire region of the second outer surface 221, or the second flexible element 620 may cover a partial region of the second surface 102 and a partial region of the second outer surface 221, as long as the second cover body 220 can be connected to the main body 100, and the second cover body 220 is rotatable relative to the main body 100 around the width direction of the charger 10, i.e., the direction X.

As illustrated in FIG. 7a and FIG. 8, in an embodiment, a first groove 219 is defined in the first cover body 210 and extends to a bottom of the third accommodating groove 218, a first magnetic member 510 is accommodated in the first groove 219, and the first flexible element 610 is configured to cover the first magnetic member 510; a second groove 229 is defined in the second cover body 220 and extends to a bottom of the fourth accommodating groove 228, a second magnetic member 520 is accommodated in the second groove 229, and the second flexible element 620 is configured to cover the second magnetic member 520. Magnetic forces between the first magnetic member 510 and the second magnetic member 520 provide magnetic forces for mutual attraction between the first cover body 210 and the second cover body 220. In an embodiment, the first magnetic member 510 and the second magnetic member 520 are both magnets. In another embodiment, one of the first magnetic member 510 and the second magnetic member 520 is a magnet, and the other one of the first magnetic member 510 and the second magnetic member 520 can be a member magnetically attracted by the magnet, such as a common iron block.

In another embodiment, the first magnetic member 510 may be located on the first outer surface 211 or the first inner surface 212 of the first cover body 210, and the second magnetic member 520 may be located on the second outer surface 221 or the second inner surface 222 of the second cover body 220, and likewise, to provide magnetic forces for mutual attraction between the first cover body 210 and the second cover body 220.

As illustrated in FIG. 3, the charger 10 is in the first state, the first cover body 210 and the second cover body 220 are magnetically attracted and fixed to each other by mean of the first magnetic member 510 and the second magnetic member 520, and the magnetic forces of the first magnetic member 510 and the second magnetic member 520 penetrate the first inner surface 212 and the second inner surface 222. When the user puts the charger 10 in a pocket or a suitcase, the pin 300 is hidden in the first cover body 210 and the second cover body 220, and thus the pin 300 is prevented from scratching surrounding objects. In addition, since the first cover body 210 and the second cover body 220 are not easy to be opened, the charger 10 can reliably hide the pin 300 during storage or transportation.

As illustrated in FIG. 3, FIG. 5, and FIG. 6a, in an embodiment, the magnetic forces for mutual attraction between the first magnetic member 510 and the second magnetic member 520 include a first magnetic force F1 and a second magnetic force F2. The first magnetic force F1 penetrates the first inner surface 212 and the second inner surface 222 to enable the first cover body 210 and the second cover body 220 to have a tendency of rotating to the first state; and the second magnetic force F2 penetrates the first outer surface 211, the second outer surface 221, and the body 20 to enable the first cover body 210 and the second cover body 220 to have a tendency of rotating to the second state.

When the charger 10 is in the first state, the first cover body 210 and the second cover body 220 tightly attract each other through the first magnetic force F1 between the first magnetic member 510 and the second magnetic member 520, and thus the first cover body 210 and the second cover body 220 will not depart from each other. When the first cover body 210 and the second cover body 220 need to be opened, the user needs to apply a force to the first cover body 210 or the second cover body 220 to overcome the first magnetic force F1 between the first magnetic member 510 and the second magnetic member 520, so as to rotate the first cover body 210 or the second cover body 220 relative to the main body 100. A critical angle $\alpha$ is an angle between the first cover body 210 and the main body 100 or an angle between the second cover body 220 and the main body 100. That is, the critical angle $\alpha$ is an angle between a plane where the first outer surface 211 is located and a plane where the first surface 101 is located, or an angle between a plane where the second outer surface 221 is located and a plane where the second surface 102 is located. When one of the first cover body 210 and the second cover body 220 is in the first state or the second state, and the angle between the other one of the first cover body 210 and the second cover body 220 and the main body 100 is the critical angle $\alpha$, the first magnetic force F1 and the second magnetic force F2 are in a balanced state. That is, the first magnetic force F1 and the second magnetic force F2 interact with each other to make the first cover body 210 and the second cover body 220 in a balanced state. When one of the first cover body 210 and the second cover body 220 is in the second state, and the angle between the other one of the first cover body 210 and the second cover body 220 and the main body 100 is greater than the critical angle $\alpha$, the first magnetic force F1 is greater than the second magnetic force F2, and the first cover body 210 and the second cover body 220 can automatically return to the first state. When one of the first cover body 210 and the second cover body 220 is in the first state, and the angle between the other one of the first cover body 210 and the second cover body 220 and the main body 100 is smaller than the critical angle $\alpha$, the first magnetic force F1 is smaller than the second magnetic force F2, and the first cover body 210 and the second cover body 220 can automatically return to the second state.

It is assumed that the user applies a force to the first cover body 210, and the first cover body 210 is rotated, while the second cover body 220 remains stationary. In this case, the first magnetic force F1 is greater than the second magnetic force F2 to enable the first cover body 210 and the second cover body 220 to have a tendency of returning to the first state. When the first cover body 210 is in the first state is rotated, but the angle between the first cover body 210 and the main body 100 has not yet reached the critical angle α, the first magnetic force F1 gradually decreases while the second magnetic force F2 gradually increases, and the first magnetic force F1 is greater than the second magnetic force F2, thereby enabling the first cover body 210 and the second cover body 220 to have the tendency of returning to the first state. When the first cover body 210 is rotated until the angle between the first cover body 210 and the main body 100 reaches the critical angle α, the first magnetic force F1 and the second magnetic force F2 are in the balanced state to enable the first cover body 210 and the second cover body 220 to be in the balanced state. Ideally, the first cover body 210 and the second cover body 220 can remain stationary in the balanced state. As the user continues applying the force, the first magnetic force F1 continues decreasing while the second magnetic force F2 continues increasing, and the first magnetic force F1 is always smaller than the second magnetic force F2, the user can stop applying the force to the first cover body 210, the first cover body 210 and the second cover body 220 are driven by the second magnetic force F2 to automatically rotate relative to the main body 100, until both the first cover body 210 and the second cover body 220 are attached to the main body 100. When the user uses the charger 10 in the second state to provide power supply to an electronic component, the first cover body 210 and the second cover body 220 are fixedly attached to the main body 100 without shaking or rotation, which is convenient for use. It can be understood that, when the charger 10 needs to be opened, the user can also apply a force to the second cover body 220, and the charger 10 can be opened likewise, and the working principle is same as that described when the user applies a force to the first cover body 210.

As illustrated in FIG. 3, FIG. 5, and FIG. 6a, in an embodiment, when the charger 10 is in the second state, the first cover body 210 and the second cover body 220 attract each other tightly through the second magnetic force F2 between the first magnetic member 510 and the second magnetic member 520, and thus they will not depart from each other. When the charger 10 needs to be closed, the user needs to apply a force to the first cover body 210 or the second cover body 220 to overcome the second magnetic force F2 between the first magnetic member 510 and the second magnetic member 520, so as to rotate the first cover body 210 or the second cover body 220 relative to the main body 100. It is assumed that the user applies a force to the first cover body 210, the first cover body 210 is rotated to depart from the main body 100, while the second cover body 220 maintains to be attached to the main body 100. With the rotation of the first cover body 210, the second magnetic force F2 decreases while the first magnetic force F1 gradually increases, and the second magnetic force F2 is always greater than the first magnetic force F1. When the first cover body 210 is rotated until the angle between the first cover body 210 and the main body 100 reaches the critical angle α, the first magnetic force F1 and the second magnetic force F2 are in the balanced state. That is, the first cover body 210 and the second cover body 220 are in the balanced state under a combined action of the first magnetic force F1 and the second magnetic force F2. Ideally, the first cover body 210 and the second cover body 220 can be in a stationary state. As the user continues applying the force to the first cover body 210, the balanced state between the first magnetic force F1 and the second magnetic force F2 is disturbed to make the first magnetic force F1 greater than the second magnetic force F2, and then the user can thus stop applying the force to the first cover body 210. The first cover body 210 and the second cover body 220 can be driven by the first magnetic force F1 to automatically rotate relative to the main body 100, until the first cover body 210 and the second cover body 220 are attached and fixed to each other, such that the charger 10 is in the first state. In the first state of the charger 10, during storage, transportation, daily placement, or movement of the charger 10, the first cover body 210 and the second cover body 220 are tightly fixed to each other, and thus the charger 10 is reliable in hiding the pin 300, and it is thin in thickness and convenient to carry. It can be understood that, when the charger 10 needs to be closed, the user can also apply a force to the second cover body 220, and the charger 10 can be closed likewise and the working principle is the same as that described when the user applies a force to the first cover body 210.

In an embodiment, each of the first cover body 210 and the second cover body 220 is partially or entirely made of a magnetic material to generate magnetic forces for mutual attraction between the first cover body 210 and the second cover body 220. Therefore, the first cover body 210 and the second cover body 220 can be automatically opened and closed according to the same principle as described above, which is not described in detail herein.

In an embodiment, a structure of each of the cover body and the main body 100 is partially or entirely made of a magnetic material to generate magnetic forces for mutual attraction between the cover body and the main body. For example, a part of a structure of each of the first cover body 210 and the second cover body 220 is made of a magnetic material to generate magnetic forces for mutual attraction between the first cover body 210 and the second cover body 220, thereby maintaining the first state of the charger 10; and a part of the structure of the main body 100 is made of a magnetic material to generate magnetic forces for mutual attraction between the first cover body 210 and the main body 100 and between the second cover body 220 and the main body 100, thereby maintaining the second state of the charger 10. Likewise, the first cover body 210 and the second cover body 220 can be can be automatically opened and closed according to the same principle as described above, which is not described in detail herein.

Figure 7B:
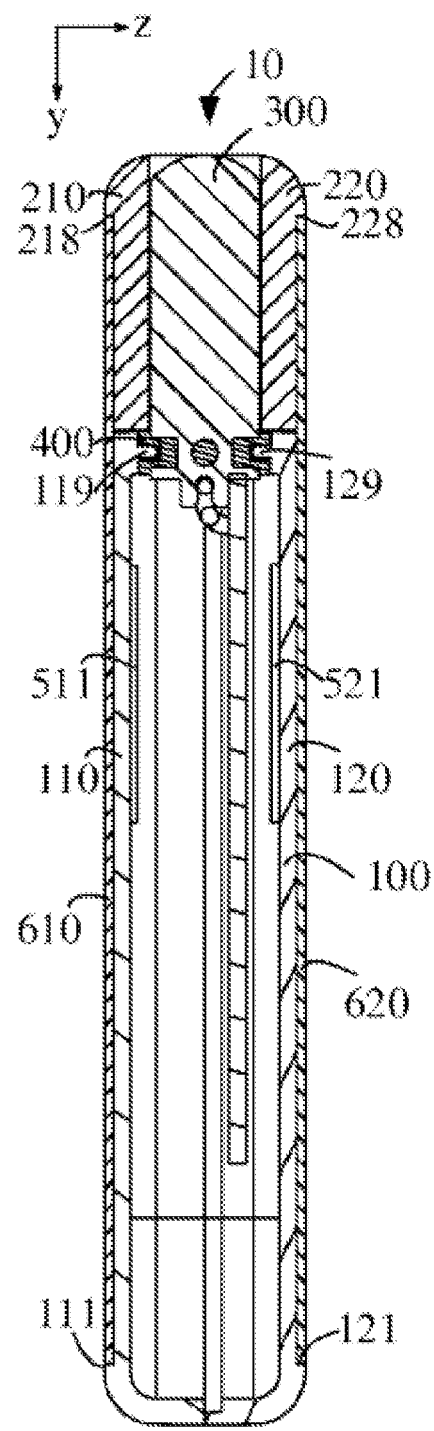
FIG. 7b is a cross-sectional view of a part A-A of a charger illustrated in FIG. 2 according to yet another embodiment.

As illustrated in FIG. 7b, in an embodiment, the first magnetic member 510 has a relatively small thickness and a sheet-like structure, and the first magnetic member 510 is fixed to the first inner surface 212; the second magnetic member 520 has a relatively small thickness and a sheet-like structure, and the second magnetic member 520 is fixed to the second inner surface 222, thereby enabling the first cover body 210 and the second cover body 220 to maintain the first state. A third magnetic member 511 and a fourth magnetic member 512 each having a relatively small thickness are fixed to the two opposite sides of the main body 100, respectively. A magnetic force for mutual attraction is formed between the first magnetic member 212 and the third magnetic member 511, and a magnetic force for mutual attraction is formed between the second magnetic member 212 and the fourth magnetic member 512, thereby enabling the first cover body 210 and the second cover body 220 to maintain the second state. The magnetic forces for mutual attraction between the first magnetic member 510 and the second magnetic member 520 enable the charger 10 to have automatic closing function; and the charger 10 can have an automatic opening function by means of the magnetic forces for mutual attraction between the first magnetic member 510 and the third magnetic member 511, together with the magnetic forces for mutual attraction between the second magnetic member 520 and the fourth magnetic member 512.

As illustrated in FIG. 7a and FIG. 8, in an embodiment, the main body includes a first housing 110 and a second housing 120. Both the first housing 110 and the second housing 120 are open shell-like structures. An accommodating space is defined by the first housing 110 and the second housing 120. A circuit board 700 is mounted in the accommodating space. One end of the circuit board 700 is electrically connected to the pin 300, and the other end of the circuit board 700 can be electrically connected to an external electronic component to electrically connect the external electronic component to the pin 300. In this way, when the charger 10 is connected to a power source, the power source can supply power to the external electronic component through the charger 10. It can be understood that the external electronic component may be an intermediate connection line such as a data cable, or an electronic device such as a mobile phone, a watch, a tablet, or a computer, or a combination of an electronic device and a data cable corresponding to the electronic device, and the external electronic component is not specifically limited in the present disclosure.

A charging interface 109 is defined in the main body, and penetrates a part of an edge of the first housing 110, a part of an edge of the second housing 120, and the first end surface 105. The external electronic component can be electrically connected to the circuit board 700 through the charging interface 109, or electrically connected to contacts extending from the circuit board 700, so as to be electrically connected to the circuit board 700.

As illustrated in FIG. 7a and FIG. 8, in an embodiment, the charger 10 includes a fixing base 400, and the pin 300 is fixed to the fixing base 400. A first channel 410 and a second channel 420 that are opposite to each other are defined in the fixing base 400, a first convex rib 119 is provided on the first housing 110, and a second convex rib 129 is provided on the second housing 120. The fixing base 400 is mounted between the first housing 110 and the second housing 120, the first convex rib 119 is engaged in the first channel 410, and the second convex rib 129 is engaged in the second channel 420, such that the fixing base 400 is fixedly mounted between the first housing 110 and the second housing 120. A main board and the fixing base 400 are electrically connected to each other via a wire 710, so as to electrically connect the main board to the pin 300.

In an embodiment, a method for preparing the charger 10 is provided. The method includes: providing the pin 300, the main body 100, the first cover body 210, and the second cover body 220, a magnetic force being formed between the first cover body 210 and the second cover body 220; fixing the pin 300 to the main body 100; and rotatably connecting the first cover body 210 and the second cover body 220 to two opposite sides of the main body 100, respectively. The first cover body 210 and the second cover body 220 have the second state and the first state relative to the main body 100. In the second state, the first cover body 210 is attached and fixed to the second cover body 220, and the at least part of the structure of the pin 300 is covered by the first cover body 210 and the second cover body 220. In the first state, the first cover body 210 and the second cover body 220 are attached and fixed to two sides of the main body 100, respectively.

Figure 9:
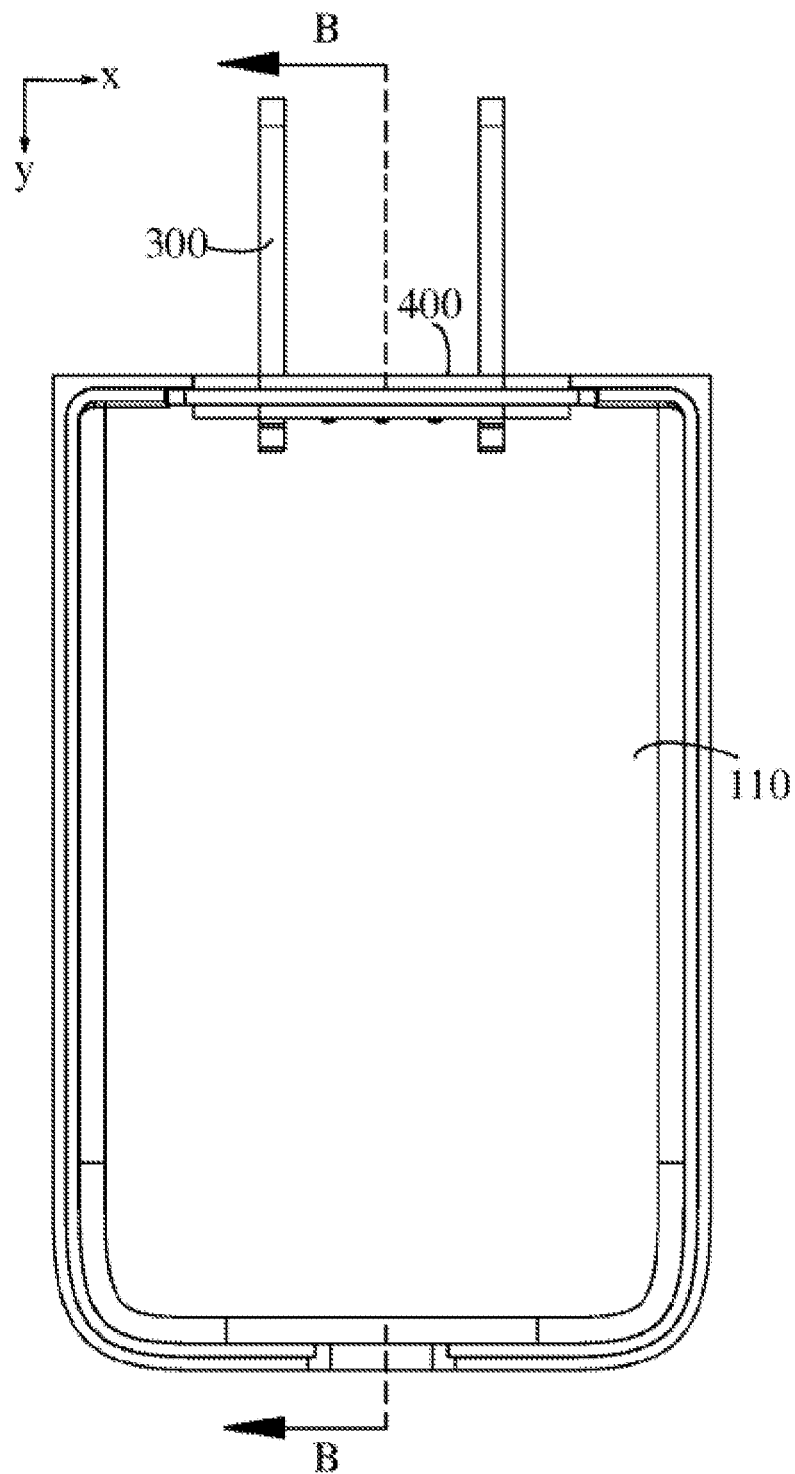
FIG. 9 is a diagram of an assembly process of a charger illustrated in FIG. 2, in which a fixing base is mounted on a first housing.
Figure 10:
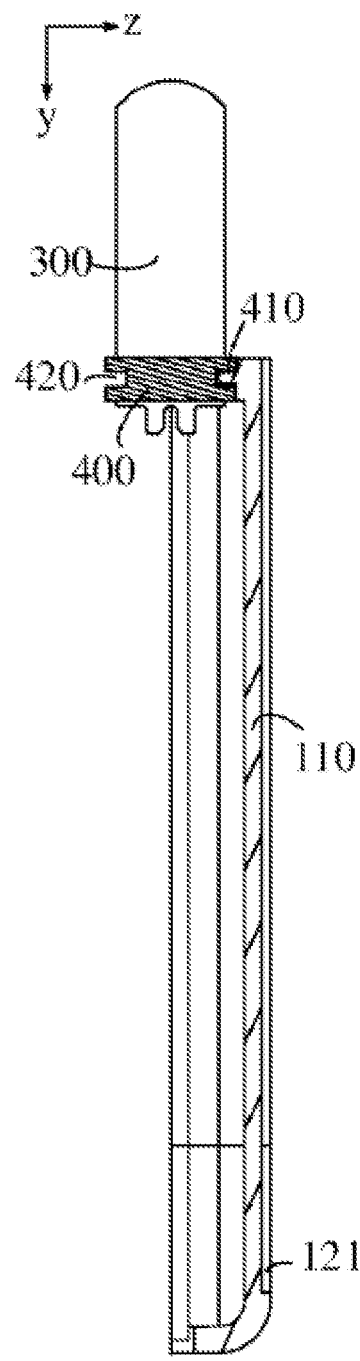
FIG. 10 is a cross-sectional view of a part B-B of a structure illustrated in FIG. 9.

As illustrated in FIG. 9 and FIG. 10, in an embodiment, the pin 300 and the fixing base 400 are fixed to each other, or the pin 300 and the fixing base 400 formed as one piece can be purchased. It can be understood that the pin 300 can be electrically connected to the fixing base 400, or a part of a structure on the fixing base 400. In this way, after the circuit board 700 is connected to the fixing base 400, the circuit board 700 can be electrically connected to the pin 300. The fixing base 400 is fixed to the first housing 110 to enable the first convex rib 119 to be engaged in and fixed to the first channel 410.

Figure 11:
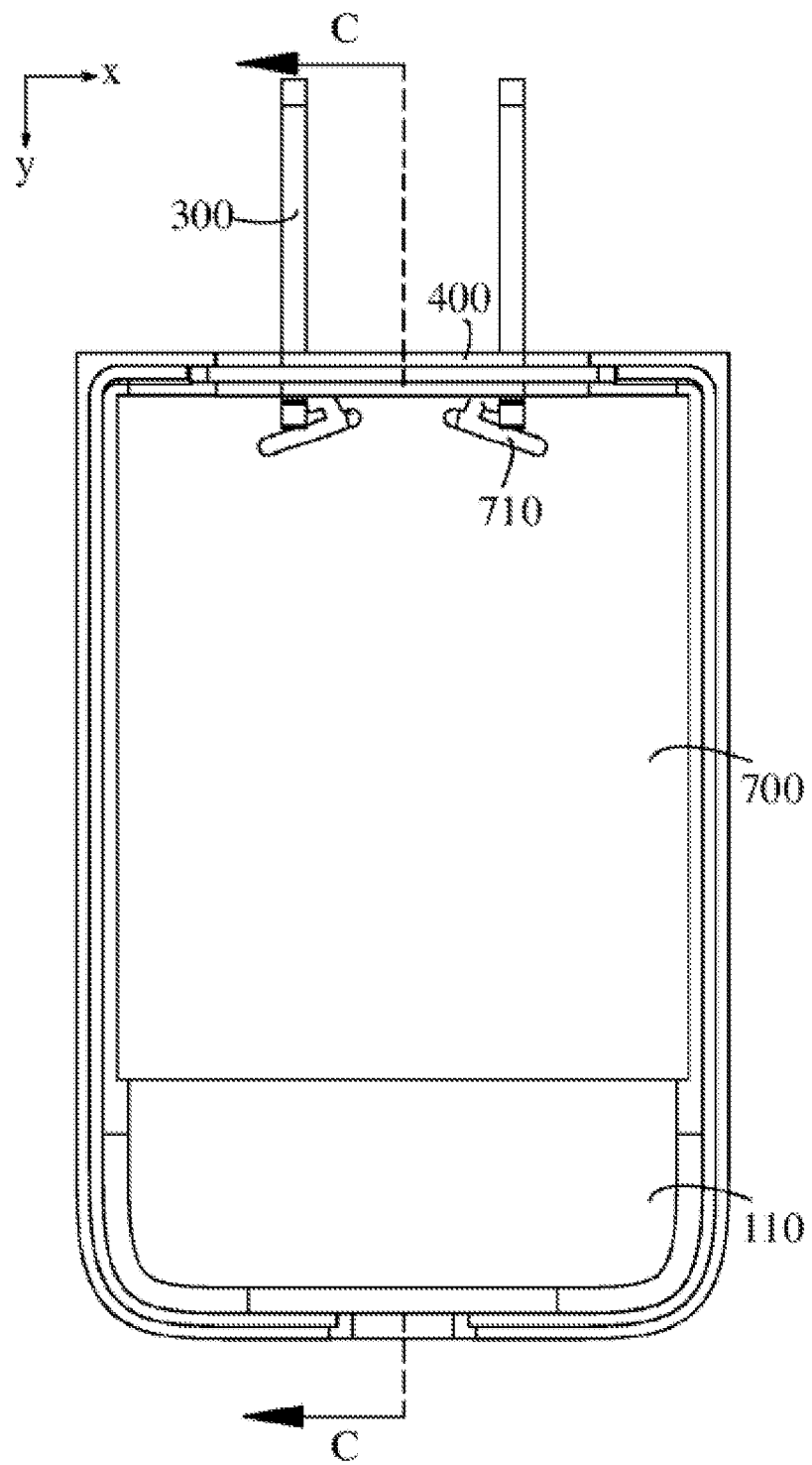
FIG. 11 is a diagram of a further assembly process of a structure illustrated in FIG. 9, in which a circuit board is mounted on a first housing.
Figure 12:
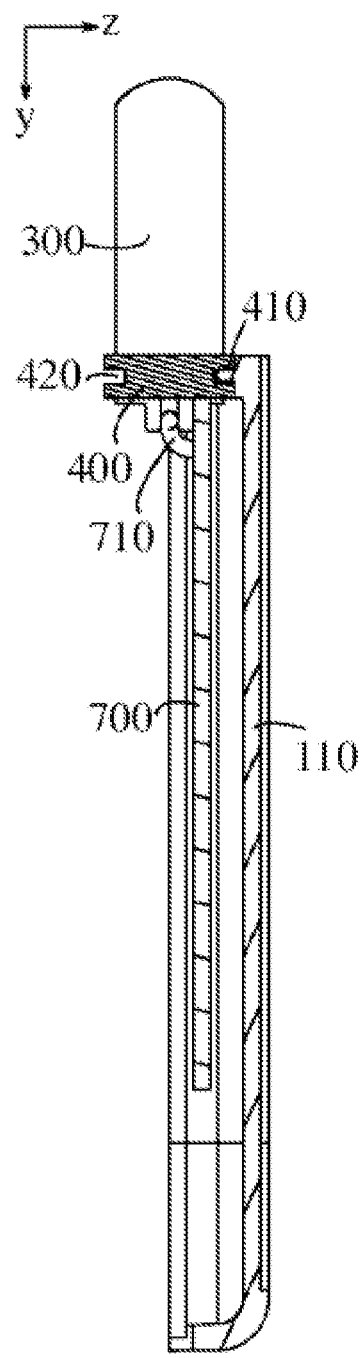
FIG. 12 is a cross-sectional view of a part C-C of a structure illustrated in FIG. 11.

As illustrated in FIG. 11 and FIG. 12, in an embodiment, the circuit board 700 is provided and fixed in the first housing 110. The circuit board 700 and the fixing base 400 are electrically connected to each other via the wire 710. It can be understood that the fixing base 400 has a structure capable of conducting electricity and electrically connecting to the pin 300, such that the circuit board 700 can be electrically connected to the pin 300.

Figure 13:
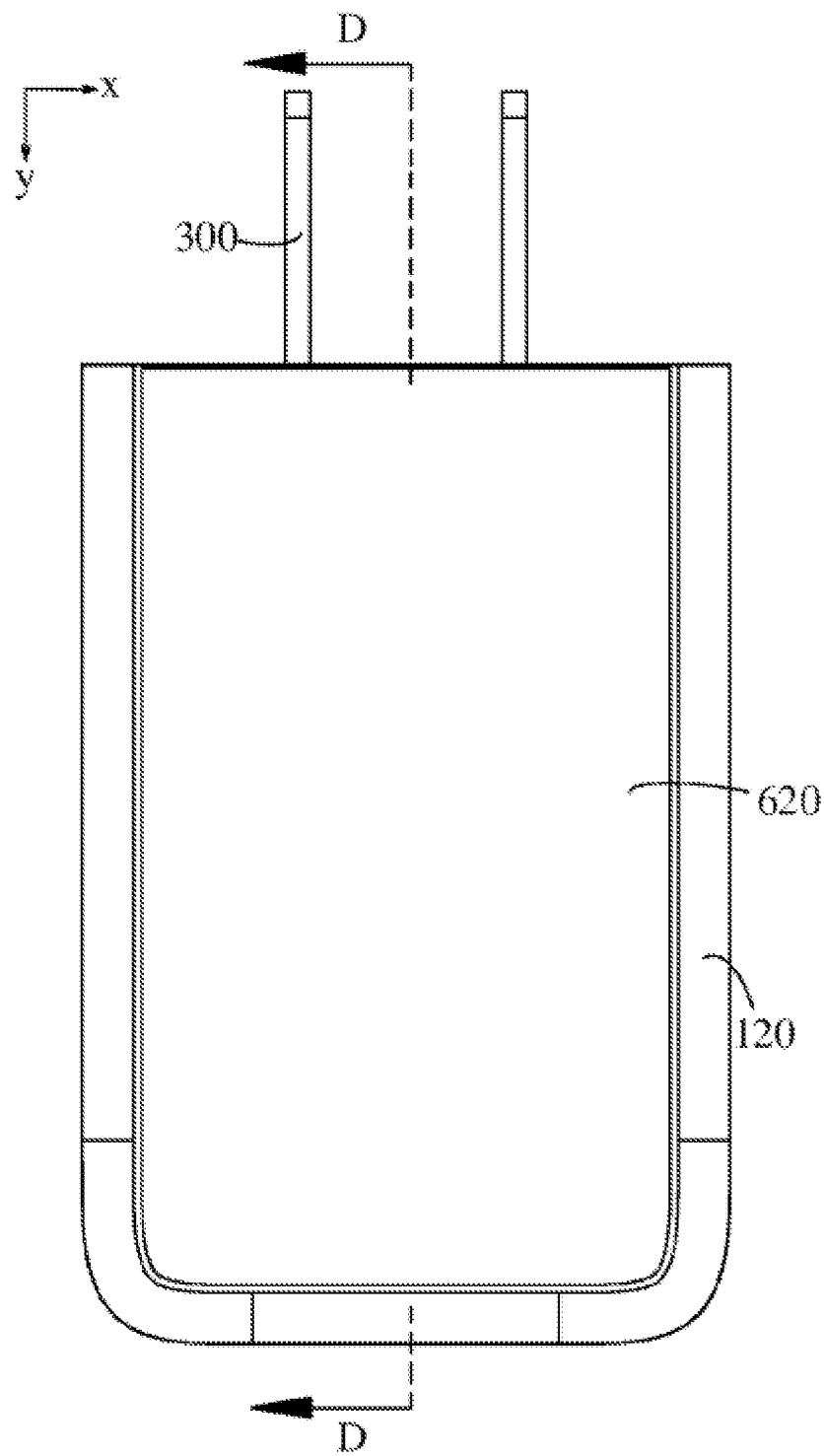
FIG. 13 is a diagram of a further assembly process of a structure illustrated in FIG. 11, in which a second housing is mounted on a first housing.
Figure 14:
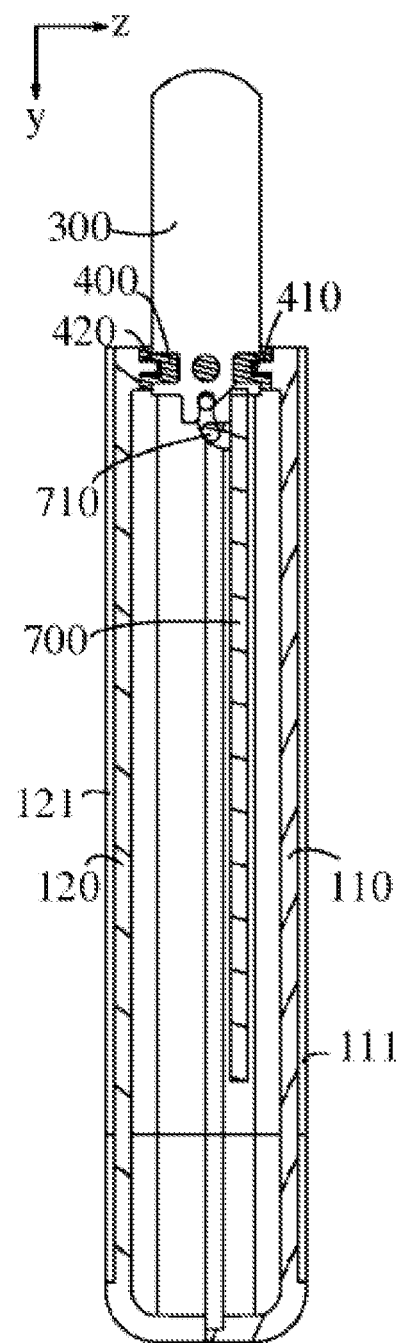
FIG. 14 is a cross-sectional view of a part D-D of a structure illustrated in FIG. 13.

As illustrated in FIG. 13 and FIG. 14, in an embodiment, the second housing 120 and the first housing 110 are assembled and fixed to each other. In an embodiment, the second housing 120 and the first housing 110 are fixed to each other through an ultrasonic hot melting process. In another embodiment, the second housing 120 and the first housing 110 can also be fixed to each other through any other process. The second convex rib 129 is engaged in the second channel 420, and the first housing 110 clamps and fixes the fixing base 400 firmly along with the second housing 120, thereby prolonging the plug-in/out life of the charger 10.

As illustrated in FIG. 2 and FIG. 7a, in an embodiment, the first magnetic member 510 is fixed in the first groove 219, and the second magnetic member 520 is fixed in the second groove 229. The first flexible element 610 is adhesively or mechanically fixed to the first accommodating groove 111 and the third accommodating groove 218, and covers the first magnetic member 510, thereby connecting the first cover body 210 to the first housing 110. The second flexible element 620 is adhesively or mechanically fixed to the second accommodating groove 121 and the fourth accommodating groove 228, and covers the second magnetic member 520, thereby connecting the second cover body 220 to the second housing 120. Due to the flexibility of the first flexible element 610 and the second flexible element 620, the first cover body 210 and the second cover body 220 can open or close the charger 10 along a certain trajectory, so as to expose or hide the pin 300.

In the first state of the charger 10, due to a magnetic field principle of the first magnetic member 510 and the second magnetic member 520, when the first cover body 210 or the second cover body 220 is opened by the critical angle $\alpha$, the second magnetic force F2 between the first magnetic member 510 and the second magnetic member 520 is greater than the first magnetic force F1 between the first magnetic member 510 and the second magnetic member 520. In this case, the first cover body 210 and the second cover body 220 can be automatically opened and maintain an open state all the time. Similarly, in the second state of the charger 10, when the first cover body 210 or the second cover body 220 is closed to a position corresponding to the critical angle $\alpha$, the second magnetic force F2 between the first magnetic member 510 and the second magnetic member 520 is smaller than the first magnetic force F1 between the first magnetic member 510 and the second magnetic member 520. In this case, the first cover body 210 and the second cover body 220 can automatically close, and the magnetic force maintains the first state.

The charger 10 has a relatively small thickness. The charger 10, when not in the use, can be kept in the first state, in which the pin 300 is hidden to provide an intact appearance and portability, and the pin 300 is prevented from damaging surrounding objects. When the charger 10 is in the second state, the first cover body 210 and the second cover body 220 are attached to the main body 100 to meet safety regulation requirements of the charger 10. Due to magnetic field characteristics of the first magnetic member 510 and the second magnetic member 520, after the first cover body 210 or the second cover body 220 is opened by the critical angle α or closed to the position corresponding to the critical angle α, the first cover body 210 and the second cover body 220 can interact to realize the automatic opening or closing function, thereby improving user experience. The first flexible element 610 and the second flexible element 620 connect the first cover body 210 and the second cover body 220 to the main body 100, respectively, and a rotating mechanism can be omitted. In addition, the first flexible element 610 and the second flexible element 620 are the appearance of the charger 10 and the charger 10 has an intact appearance due to the visually complete planes.

Figure 15:
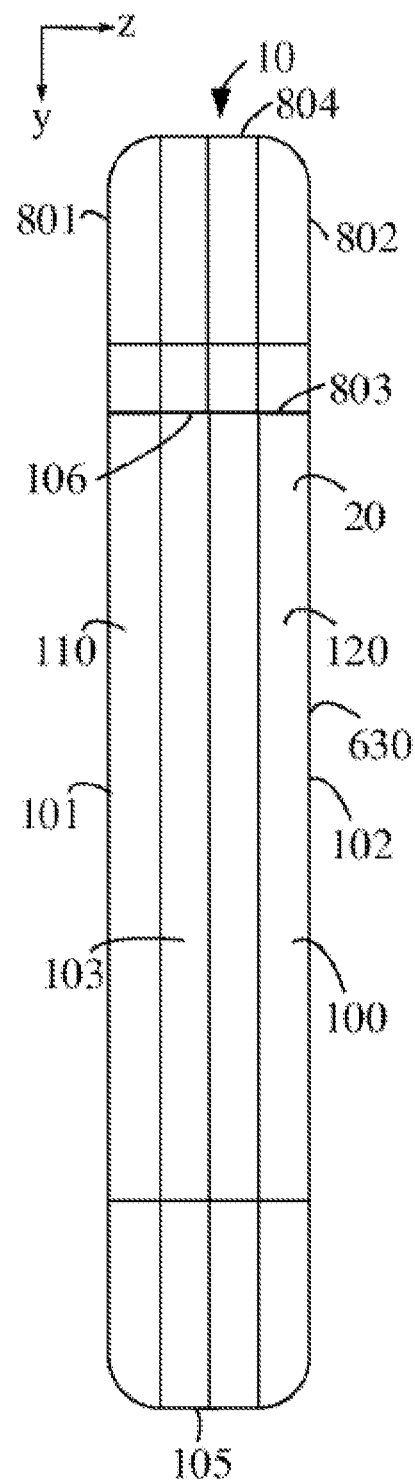
FIG. 15 is a side view of a charger according to yet another embodiment, in which the charger is in a first state.
Figure 16:
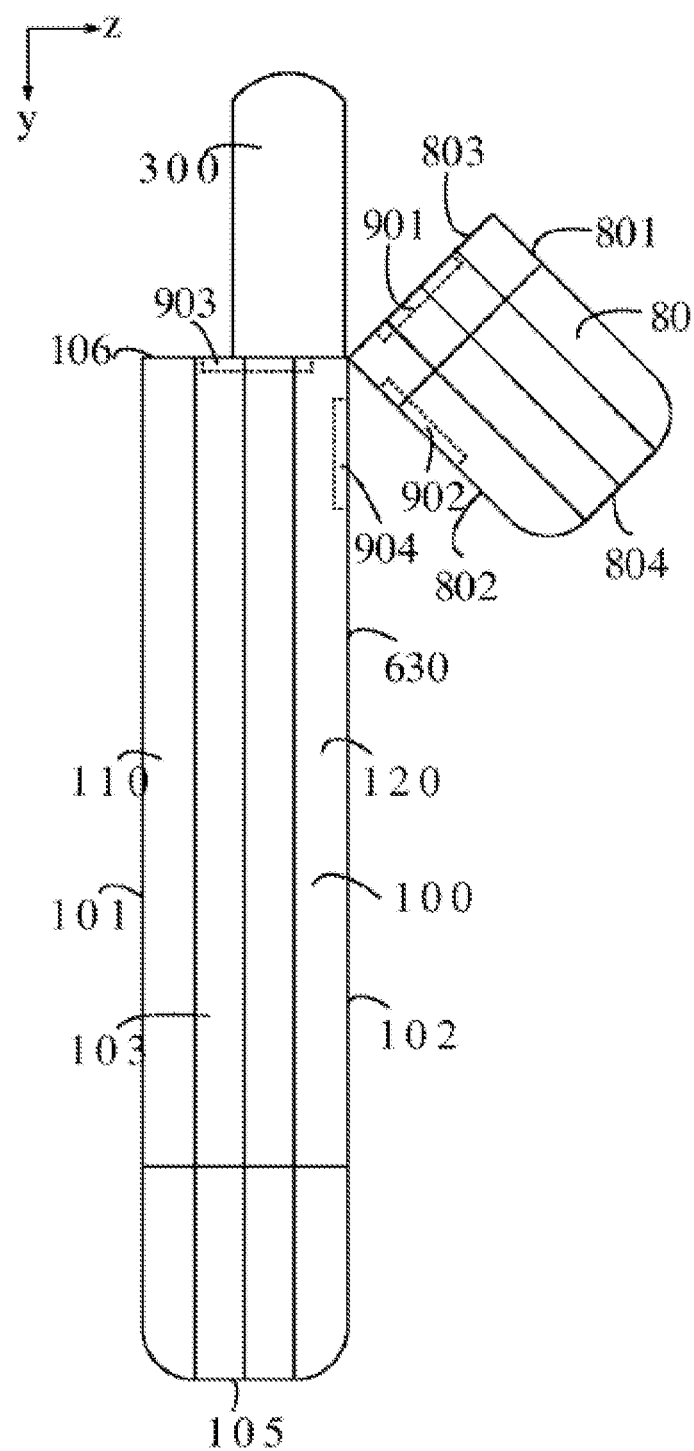
FIG. 16 is a side view of a charger illustrated in FIG. 15, in which the charger is in a state between a first state and a second state.
Figure 17:
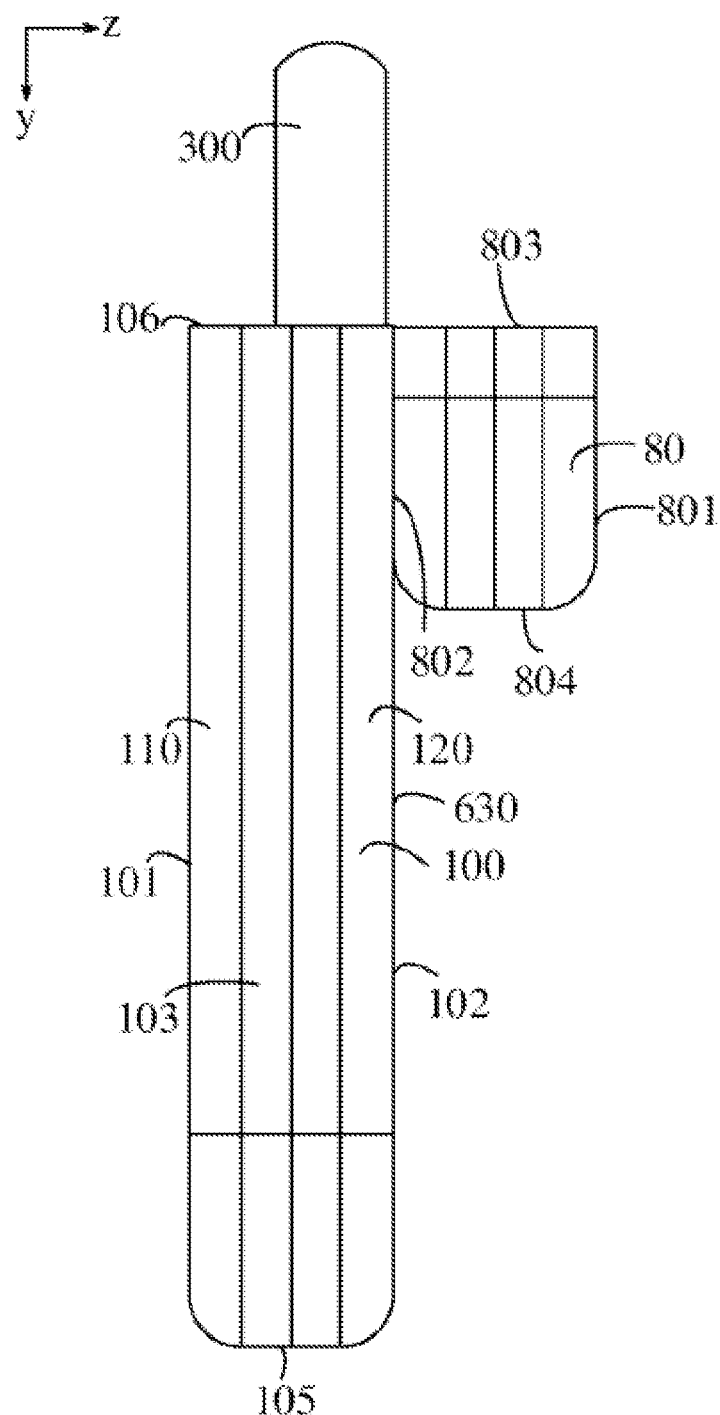
FIG. 17 is a side view of a charger illustrated in FIG. 15, in which the charger is in a second state.

As illustrated in FIG. 15 to FIG. 17, in an embodiment, one cover body 80 is provided, and two pins 300 are provided and arranged along the width direction of the body 20, i.e., the direction X. The cover body 80 is rotatably connected to the main body 100. The cover body 80 is rotatable relative to the main body 100 to have the first state and the second state. In the first state, the cover body 80 is configured to cover the end portion of the main body 100, and the at least part of the structure of the pin 300 can be accommodated in the cover body 80. The structure of the pin 300 can be completely accommodated in the cover body 80, or a part of the structure of the pin 300 may be exposed. In the second state, the cover body 80 is opened and stacked on one side of the main body, and the cover body 80 is attached to a surface of the main body. The expression "attached to" means that no spacing or a small spacing exists therebetween. A distance between the pin 300 and a surface of the cover body 80 facing away from the main body 100, as well as a distance between the pin 300 and a surface of the main body 100 facing away from the cover body 80 are both equal to or greater than the predetermined value, in order to ensure that the charger 10 meets the safety regulation requirements. In an embodiment, the predetermined value is 6.5 mm. In other embodiments, the preset value may also be other values.

As illustrated in FIG. 15 to FIG. 17, in an embodiment, the cover body 80 includes a sixth surface 801 and a seventh surface 802 that are opposite to each other, and a sixth end surface 803 and a seventh end surface 804 that are opposite to each other. The sixth end surface 803 is connected to one end of the sixth surface 801 and the seventh surface 802, and the seventh end surface 804 is connected to the other end of the sixth surface 801 and the seventh surface 802. As illustrated in FIG. 15, in the first state, the sixth end surface 803 is attached to the second end surface 106, the first surface 101 is flush with the sixth surface 801, and the second surface 102 is flush with the seventh surface 802. The cover body 80 is turned over and rotated to the second state. As illustrated in FIG. 17, in the second state, the seventh surface 802 is attached to the second surface 102, and the sixth end surface 803 is flush with the second end surface 106. It can be understood that the cover body 80 can also be turned over in an opposite direction, and accordingly, in the second state, the sixth surface 801 can be attached to the first surface 101, and the sixth end surface 803 can be flush with the second end surface 106.

As illustrated in FIG. 15 to FIG. 17, in an embodiment, the charger 10 includes a third flexible element 630, and the cover body 80 and the main body 100 are connected to each other through the third flexible element 630 to perform a rotation. Specifically, a part of a structure of the third flexible element 630 is attached and fixed to the second surface 102, and the remaining part of the structure is attached and fixed to the seventh surface 802 of the cover body 80. The third flexible element 630 has flexibility and is foldable, such that the cover body 80 is rotatable relative to the main body 100 to be located in the first state and the second state. It can be understood that a groove may be defined in each of the second surface 102 and the seventh surface 802, and the third flexible element 630 is fixed in the groove to be flush with the second surface 102 and the seventh surface 802, thereby presenting an aesthetic appearance.

In an embodiment, at least part of a structure of the cover body 80 or the main body 100 is made of a magnetic material to generate magnetic forces for mutual attraction between the cover body 80 and the main body 100.

As illustrated in FIG. 15 to FIG. 17, in an embodiment, a sixth magnetic member 901 and a seventh magnetic member 902 are provided in the cover body 80. The sixth magnetic member 901 is closer to the sixth end surface 803, and the seventh magnetic member 902 is closer to the seventh surface 802. An eighth magnetic member 903 closer to the second end surface 106 and a ninth magnetic member 904 closer to the second surface 102 are provided in the main body. A magnetic force for mutual attraction is generated between the sixth magnetic member 901 and the eighth magnetic member 903; and a magnetic force for mutual attraction is generated between the seventh magnetic member 902 and the ninth magnetic member 904. In the first state, the cover body 80 and the main body 100 are magnetically attracted and fixed to each other through the magnetic forces for mutual attraction between the sixth magnetic member 901 and the eighth magnetic member 903. In the second state, the cover body 80 and the main body 100 are magnetically attracted and fixed to each other through the magnetic forces for mutual attraction between the seventh magnetic member 902 and the ninth magnetic member 904. During the rotation of the cover body 80, when a magnetic force between the sixth magnetic member 901 and the eighth magnetic member 903 is greater than a magnetic force between the seventh magnetic member 902 and the ninth magnetic member 904, the cover body 80 can automatically rotate to the first state and can be maintained in the first state. When the magnetic force between the sixth magnetic member 901 and the eighth magnetic member 903 is smaller than the magnetic force between the seventh magnetic member 902 and the ninth magnetic member 904, the cover body 80 can automatically rotate to the second state and ca be maintained in the second state.

In another embodiment, the sixth magnetic member 901 may also be fixed to the sixth end surface 803 in such a manner that the sixth magnetic member 901 is flush with the sixth end surface 803, or the sixth magnetic member 901 slightly protrudes from or recesses in the sixth end surface 803. The seventh magnetic member 902 may be fixed to the seventh surface 802 in such a manner that the seventh magnetic member 902 is flush with the seventh end surface 802, or the seventh magnetic member 902 slightly protrudes from or recesses in the seventh end surface 802. The eighth magnetic member 903 may be fixed to the second end surface 106 in such a manner that the eighth magnetic member 903 is flush with the second end surface 106, or the eighth magnetic member 903 slightly protrudes from or recesses in the second end surface 106. The ninth magnetic member 904 may be fixed to the second surface 102 in such a manner that the ninth magnetic member 904 is flush with the second surface 102, or the ninth magnetic member 904 slightly protrudes from or recesses in the second surface 102.

Figure 18:
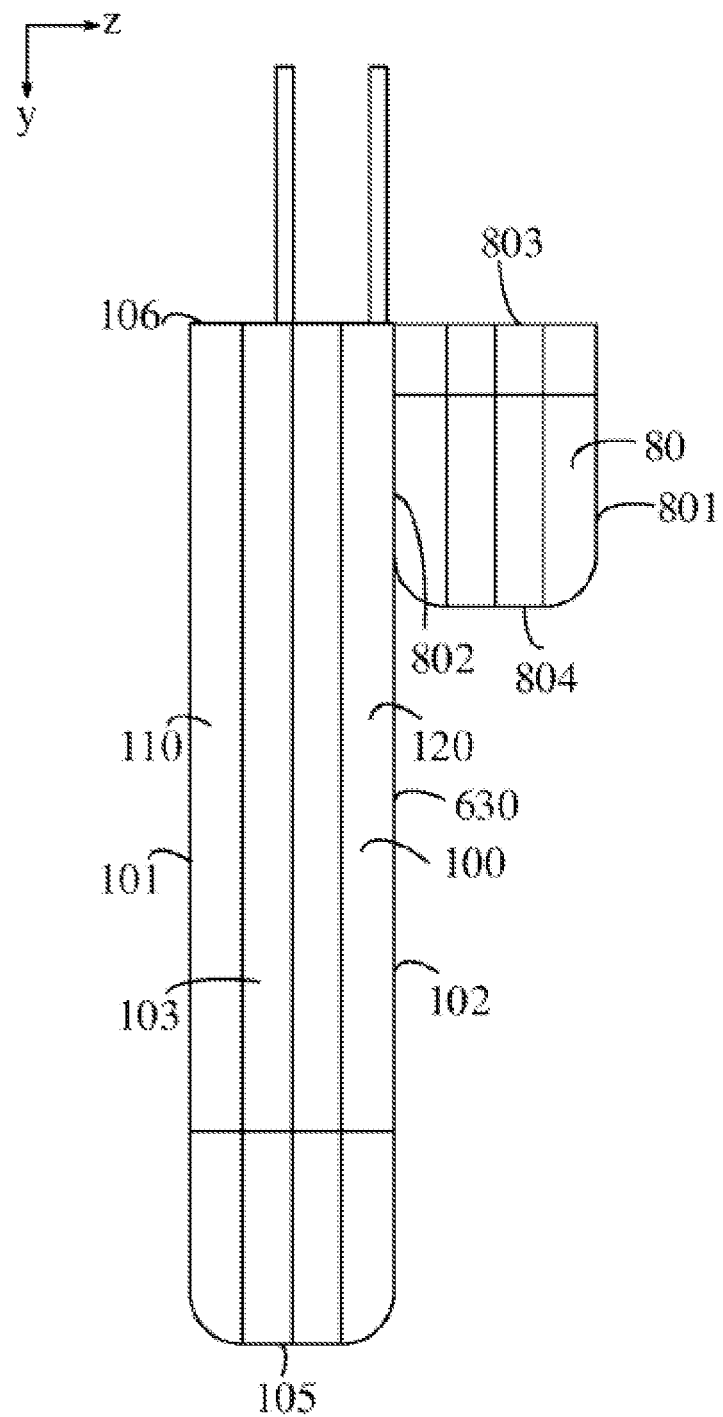
FIG. 18 is a side view of a charger according to yet another embodiment, in which the charger is in a second state.

As illustrated in FIG. 18, in an embodiment, two pins 300 are arranged along the thickness direction of the charger 10, i.e., the direction Z. That is, one of the two pins 300 is closer to the first surface 101, and the other one of the two pins 300 is closer to the second surface 102. The two pins 300 have different distances from the first surface 101, and the two pins 300 have different distances from the second surface 102. In the second state, the two pins 300 have different distances from an edge i.e., the sixth surface 801, of the cover body 80. In the present embodiment, in the second state, the minimum distance between the pin 300 and the edge of the body 20 is equal to or greater than the predetermined value, the distance between the pin 300 closer to the first surface 101 and the first surface 101 is equal to or greater than the predetermined value, the distance between the pin 300 farther from the first surface 101 and the sixth surface 801 is equal to or greater than the predetermined value, a distance between each of the two pins 300 and the first side surface 103 is equal to or greater than the predetermined value, and a distance between each of the two pins 300 and the second side surface 104 is equal to or greater than the predetermined value. In an embodiment, the predetermined value is 6.5 mm.

The technical features described in the above embodiments can be combined arbitrarily. For brevity of description, not all the possible combinations of the technical features in the above embodiments are described. However, a combination of these technical features should be construed as falling within the scope of the present disclosure, as long as no contradiction exists in the combination.

The above embodiments illustrate merely some implementations of the present disclosure. Although the above embodiments are described specifically and in detail, the description should not be construed as the limitations on the scope of the present disclosure. It should be pointed out that, various modifications and improvements can be made by those skilled in the art without departing from the concept of the present disclosure, and they shall fall within the protection scope of the present disclosure as defined by the appended claims.

What is claimed is:

1. A charger, comprising:
a body comprising a main body, a first cover body, and a second cover body; and
a pin fixedly disposed on the main body,
wherein the first cover body and the second cover body are each connected to and rotatable relative to the main body to have a first state and a second state;
the first cover body has a first engagement slot defined therein;
the second cover body has a second engagement slot defined therein;
in the first state, the first cover body and the second cover body are attached to each other, at least part of a structure of the pin is accommodated in the first cover body and the second cover body, the first engagement slot is in communication with the second engagement slot, and the pin is accommodated in the first engagement slot and the second engagement slot; and
in the second state, the first cover body and the second cover body depart from each other to enable the first cover body and the second cover body to expose the at least part of the structure of the pin to the outside.

2. The charger according to claim 1, wherein in the second state, end surfaces of the first cover body and the second cover body that are connected to the main body are flush with an end surface of the main body where the pin is disposed, to enable the first cover body and the second cover body to expose the pin to the outside, and a distance between the pin and a surface of the first cover body facing away from the main body and a distance between the pin and a surface of the second cover body facing away from the main body are both equal to or greater than a predetermined value.

3. The charger according to claim 1, wherein the first cover body and the main body are connected to each other through a flexible element to perform a rotation; and the second cover body and the main body are connected to each other through a flexible element to perform a rotation.

4. The charger according to claim 3, wherein the flexible element comprises a first flexible element and a second flexible element;
a part of a structure of the first flexible element is attached and fixed to a side of the main body, and the remaining part of the structure of the first flexible element is attached and fixed to the first cover body; and
a part of a structure of the second flexible element is attached and fixed to the other side of the main body, and the remaining part of the structure of the second flexible element is attached and fixed to the second cover body.

5. The charger according to claim 1, wherein the main body has a first surface and a second surface that are opposite to each other; and the first cover body has a first outer surface and a first inner surface that are opposite to each other, and the second cover body has a second outer surface and a second inner surface that are opposite to each other;
in the first state, the first inner surface is attached to the second inner surface, the first outer surface is flush with the first surface, and the second outer surface is flush with the second surface; and
in the second state, the first outer surface is attached to the first surface, and the second outer surface is attached to the second surface.

6. The charger according to claim 5, wherein two pins are provided, a distance between each of the two pins and the first surface is L1, and a distance between each of the two pins and the second surface is L2; and
the distance L1 is equal to the distance L2, and the distance L1 is smaller than a predetermined value,
wherein in the second state, a distance between each of the two pins and the first inner surface is L3, and a distance between each of the two pins and the second inner surface is L4; and
the distance L3 is equal to the distance L4, and the distance L3 is equal to or greater than the predetermined value.

7. The charger according to claim 5, wherein two pins are provided, a distance between each of the two pins and the first surface is L1, and a distance between each of the two pins and the second surface is L2; and
the distance L1 is different from the distance L2, and both the distance L1 and the distance L2 are smaller than a predetermined value,
wherein in the second state, a distance between each of the two pins and the first inner surface is L3, and a distance between each of the two pins and the second inner surface is L4; and the distance L3 is different from the distance L4, and both the distance L3 and the distance L4 are equal to or greater than the predetermined value.

8. The charger according to claim 1, wherein at least part of a structure of the first cover body or the second cover body is made of a magnetic material to provide a magnetic force for mutual attraction between the first cover body and the second cover body.

9. The charger according to claim 1, wherein a first magnetic member is disposed in the first cover body, a second magnetic member is disposed in the second cover body, and a magnetic force for mutual attraction is generated between the first magnetic member and the second magnetic member, in the first state, the first cover body and the second cover body are magnetically attracted and fixed to each other by the magnetic force for mutual attraction between the first magnetic member and the second magnetic member.

10. The charger according to claim 9, wherein the main body has a third magnetic member and a fourth magnetic member, and in the second state, the first cover body is attached to one side of the main body by a magnetic force between the first magnetic member and the third magnetic member, and the second cover body is attached to the other side of the main body by a magnetic force between the second magnetic member and the fourth magnetic member.

11. The charger according to claim 9, wherein in the second state, the first cover body and the second cover body are magnetically attracted and attached to two opposite sides of the main body by magnetic forces of the first magnetic member and the second magnetic member, respectively.

12. The charger according to claim 11, wherein the first cover body has a first outer surface and a first inner surface that are opposite to each other, and the second cover body has a second outer surface and a second inner surface that are opposite to each other;

the magnetic force for mutual attraction between the first magnetic member and the second magnetic member comprises a first magnetic force and a second magnetic force;

the first magnetic force penetrates the first inner surface and the second inner surface to provide the first cover body and the second cover body with a tendency of rotating to the first state; and the second magnetic force penetrates the first outer surface and the second outer surface to provide the first cover body and the second cover body with a tendency of rotating to the second state.

13. The charger according to claim 12, wherein when the second cover body is in the second state and an angle between the first cover body and the main body is greater than a critical angle, the first cover body and the second cover body are rotated to the first state.

14. The charger according to claim 12, wherein when the second cover body is in the first state and an angle between the first cover body and the main body is smaller than a critical angle, the first cover body and the second cover body are rotated to the second state.

15. The charger according to claim 9, wherein the first cover body has a first groove defined therein, and the first magnetic member is accommodated in the first groove; and the second cover body has a second groove defined therein, and the second magnetic member is accommodated in the second groove.

16. The charger according to claim 15, further comprising a first flexible element and a second flexible element, wherein a part of a structure of the first flexible element is attached and fixed to one side of the main body, and the remaining part of the structure of the first flexible element is attached and fixed to the first cover body and is configured to cover the first groove; and a part of a structure of the second flexible element is attached and fixed to the other side of the main body, and the remaining part of the structure of the second flexible element is attached and fixed to the second cover body and is configured to cover the second groove.

17. The charger according to claim 1, wherein the main body comprises a first housing, a second housing, and a circuit board; an accommodating space is defined between the first housing and the second housing, and the circuit board is located in the accommodating space and electrically connected to the pin.

\* \* \* \* \*